United States Patent

Miura

[11] Patent Number: 5,533,171
[45] Date of Patent: Jul. 2, 1996

[54] IMAGE RECORDING APPARATUS

[75] Inventor: Shigeo Miura, Tokyo, Japan

[73] Assignee: Canon Kabushiki Kaisha, Tokyo, Japan

[21] Appl. No.: 32,330

[22] Filed: Mar. 17, 1993

[30] Foreign Application Priority Data

Mar. 18, 1992 [JP] Japan .................................. 4-062308
Apr. 28, 1992 [JP] Japan .................................. 4-109988
Jun. 12, 1992 [JP] Japan .................................. 4-153348

[51] Int. Cl.⁶ .................................................. G06K 15/00
[52] U.S. Cl. ........................................ 395/111; 395/105
[58] Field of Search .................................. 395/111, 101, 395/105, 113, 110; 346/761 PH; 347/37, 180, 215

[56] References Cited

U.S. PATENT DOCUMENTS

| 4,568,817 | 2/1986 | Leng et al. | 347/186 |
|---|---|---|---|
| 4,875,056 | 10/1989 | Ono | 346/76 PH |
| 4,963,884 | 10/1990 | Kiguchi et al. | 347/185 |
| 5,072,237 | 12/1991 | Takaoka | 395/101 |
| 5,166,699 | 11/1992 | Yano et al. | 346/1.1 |
| 5,177,499 | 1/1993 | Yoshida et al. | 347/186 |
| 5,262,799 | 11/1993 | Ono et al. | 346/76 PH |

FOREIGN PATENT DOCUMENTS

| 58-211473 | 12/1983 | Japan . |
|---|---|---|
| 61-078671 | 4/1986 | Japan . |
| 62-003969 | 1/1987 | Japan . |
| 62-094360 | 4/1987 | Japan . |
| 62-135382 | 6/1987 | Japan . |
| 62-164568 | 7/1987 | Japan . |

*Primary Examiner*—Mark R. Powell
*Assistant Examiner*—Tracy M. Legree
*Attorney, Agent, or Firm*—Fitzpatrick, Cella, Harper & Scinto

[57] ABSTRACT

When the amount of image data stored in a memory for storing input image data reaches a predetermined amount, printing of this data is started, and at the same time, a recording medium is fed. When the time interval becomes a predetermined period of time or more, a recording head is energized with a delay from the start of feeding of the recording medium. When start data of the image data of the predetermined amount is to be printed, the recording head is immediately energized to perform recording immediately after the start of feeding of the recording medium. When the recording head is energized and preheated when the time interval becomes the predetermined period of time or more, the energization condition of the recording head is set in accordance with the size of the recording medium.

33 Claims, 21 Drawing Sheets

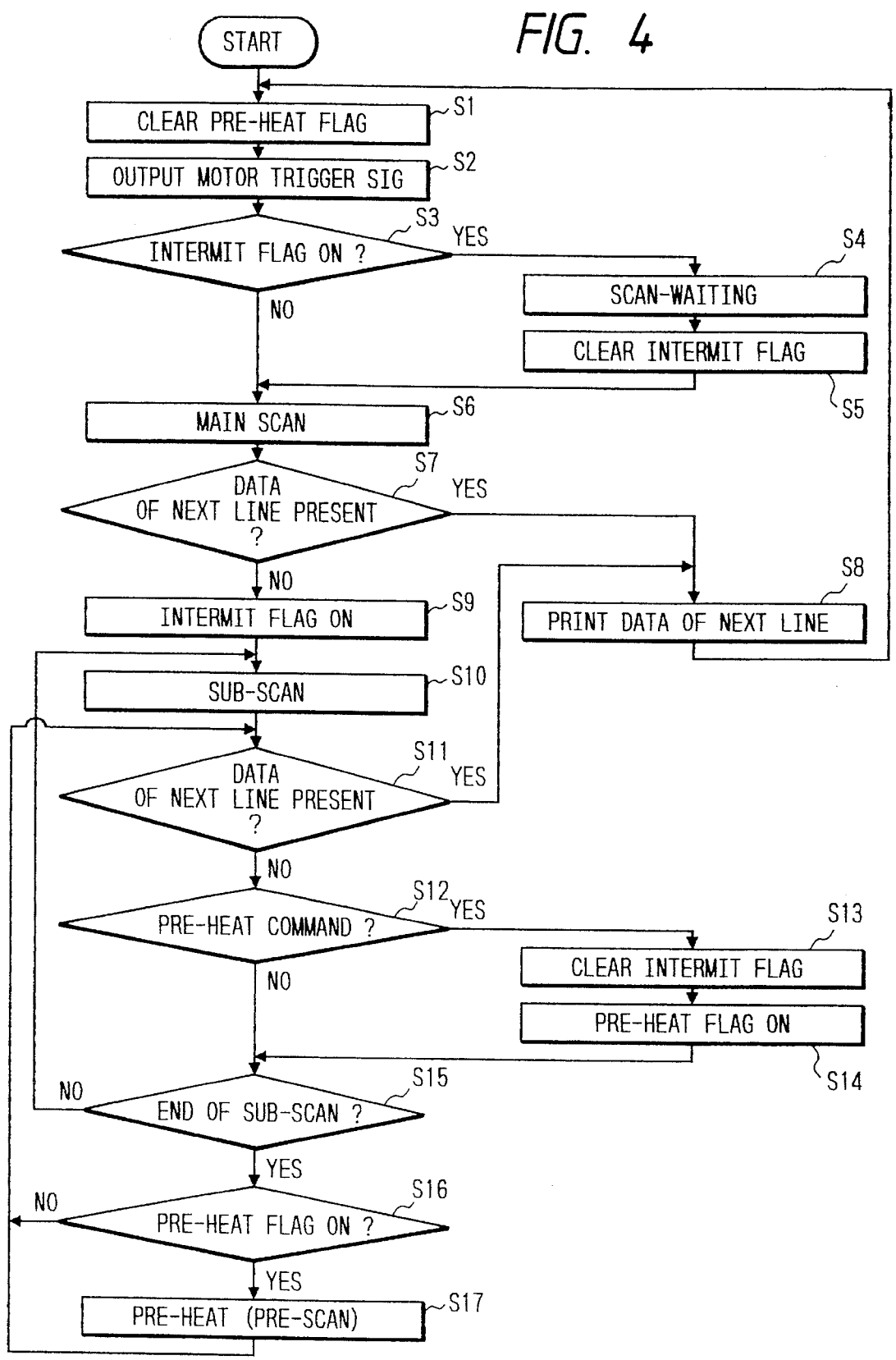

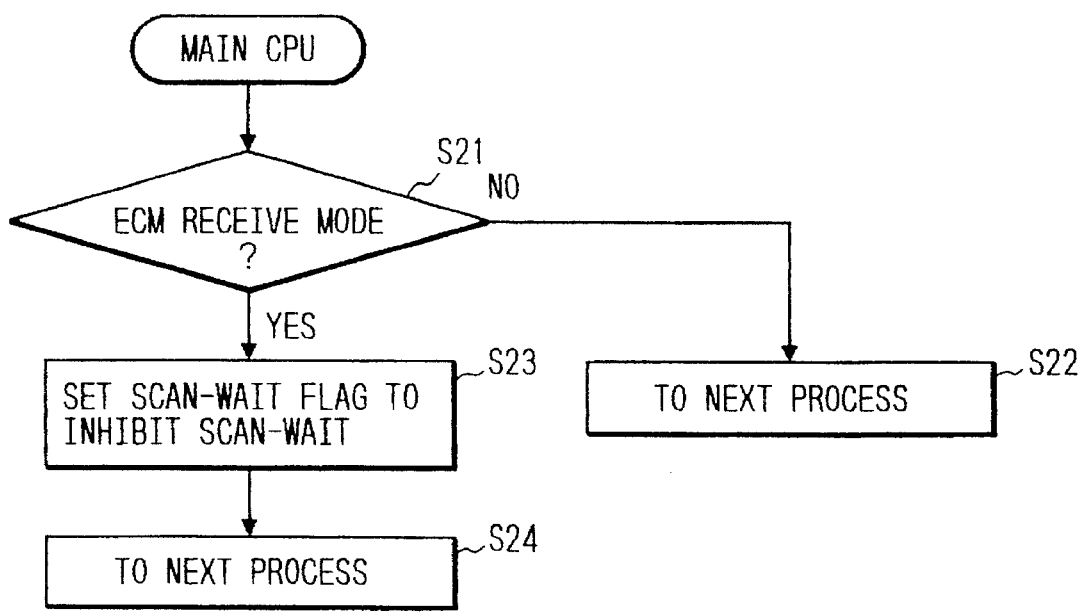
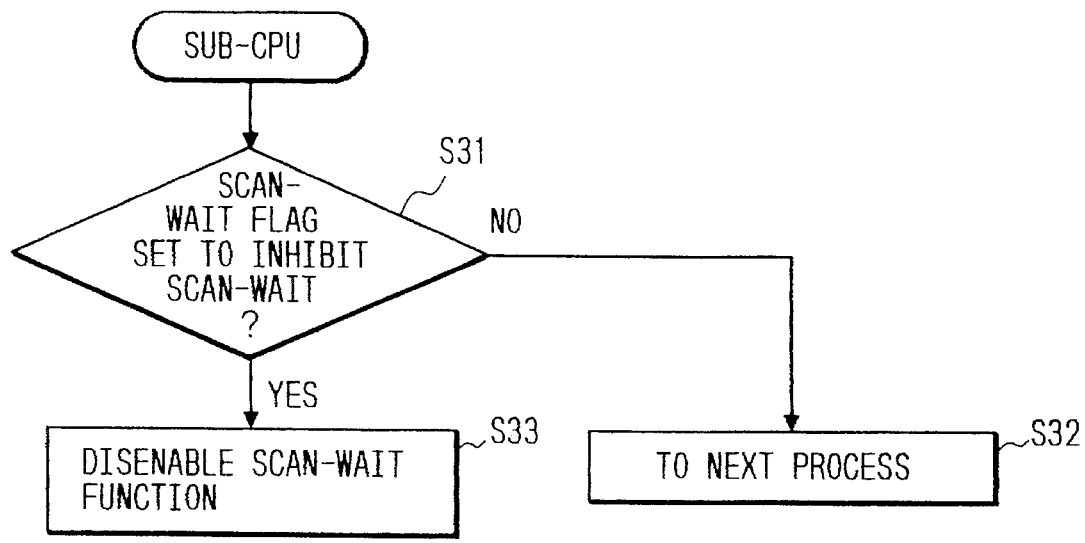

IMAGE RECORDING APPARATUS

BACKGROUND OF THE INVENTION

1. Field of the Invention

The present invention relates to an image recording apparatus used for a recorder of a facsimile apparatus or an output terminal.

2. Related Background Art

A facsimile apparatus generally has a reception buffer for temporarily storing a received image signal. For example, in an ECM (Error Correction Mode) receive mode, when the data amount of received image signal stored in the reception buffer reaches a predetermined data amount (64 Kbytes) (to be referred to as one block hereinafter), image data corresponding to the received image signal of one block is printed on recording paper. For this reason, during reception of a one-block image, printing is kept stopped, and the temperature of heating resistors (thermal head) is excessively reduced. The temperature of the heating resistors does not reach a predetermined temperature at the start of block printing, and the recording density is reduced. Thus, white stripes are formed on the recorded image, resulting in inconvenience.

In a facsimile apparatus, a paper feed motor such as a stepping motor is rotated and driven to move recording paper to relatively change the positional relationship between the recording paper and the heating resistors of the thermal head. Strobed pulses are output to the heating resistors to record an image on the recording paper. During the movement of the recording paper upon rotation and driving of the stepping motor or the like, a convey drive system of the recording paper vibrates to cause an error in the relative positional relationship between the recording paper and the heating resistors. As a result, image quality is greatly degraded.

In particular, in a facsimile apparatus for recording one-block image data when the amount of received image data stored in the reception buffer reaches a predetermined data amount (one block) in the ECM receive mode, after the last line of one block is recorded, the convey drive system greatly vibrates upon stopping of the conveyance of the recording paper. For this reason, in the conventional facsimile apparatus, after the strobed pulse signal to the heating resistors for recording the last line of one block is disabled, the recording paper feed motor continues to vibrate to excessively feed the recording paper. A white stripe is then formed in the corresponding portion of the recorded image, resulting in inconvenience.

In order to eliminate this inconvenience, small pulses are continuously supplied (multi-scan) to the heating resistors not to cause color development of the recording paper during a printing time interval between the blocks to prevent an excessive decrease in temperature of the heating resistors. According to this method, however, the excessive decrease in temperature of the heating resistors between the blocks cannot be perfectly prevented, and white stripes cannot be perfectly eliminated from the printed image. In particular, such a white stripe becomes conspicuous in a halftone image, thereby degrading the quality of the printed image.

In a facsimile apparatus having a recording means of a thermal type, a multi-scan operation can be performed to improve the recording image quality. The multi-scan operation is to increase the number of strobed pulses supplied to a heater for recording an image when a time interval between the recording cycles of the image data is increased, thereby maintaining the heater temperature constant. This operation is effective when the data transmission rate changes and the time interval between the recording periods cannot be maintained constant as in a facsimile apparatus. According to a conventional multi-scan scheme, the maximum value of the multi-scan count is fixed to a predetermined value.

In a normal facsimile apparatus, the recording time interval changes depending on the facsimile communication transmission rate. That is, the recording time interval is prolonged when the transmission rate is low. However, the recording time interval is shortened when the transmission rate is high. On the other hand, since the maximum value of the multi-scan count is predetermined, the temperature of the printing heater tends to be lowered when the transmission rate is low. For this reason, the printing density tends to decrease as a whole, and characters tend to be blurred, thereby causing degradation of image quality. To the contrary, when the transmission rate is high, the temperature of the heater tends to be high. In this case, the printing density tends to be high as a whole, and characters tend to be connected to cause degradation of the image quality.

A normal facsimile apparatus comprises a modem. A coded signal is sent on a transmission line, and this coded signal is received at a receiving end. The receiving end decodes the coded signal. Upon completion of decoding, an image recorder in the receiving end sequentially records the transmitted data. However, since the compression rate of the coded data varies depending on coding schemes, the decoding time varies accordingly. Therefore, the recording time interval varies depending on the coding schemes.

In addition, in a facsimile apparatus having both G2 and G3 modes, the recording time intervals in the G2 and G3 modes are different from each other.

In a facsimile apparatus having an image memory, the recording time interval required for storing data in the image memory and recording the data is different from that required for recording the data without storage.

Various factors which change the recording time intervals are present. Since the multi-scan count or the maximum value of the multi-scan operation is predetermined, the multi-scan for maintaining the heater temperature constant cannot properly function to cause image quality degradation of the recorded image.

SUMMARY OF THE INVENTION

The present invention has been made in consideration of the above situation, and has as its object to provide an improved image recording apparatus.

It is another object of the present invention to provide an image recording apparatus capable of performing high-quality image recording regardless of a change in recording time interval.

It is still another object of the present invention to provide an image recording apparatus capable of preventing degradation of image quality regardless of a change in size of a recording medium.

It is still another object of the present invention to provide an image recording apparatus capable of improving recording image quality by preventing formation of a white stripe or the like caused by a long recording time interval when an image is to be recorded in units of predetermined image data amounts.

It is still another object of the present invention to provide an image recording apparatus capable of preventing degradation of recording image quality by setting the drive amount of a recording head to an optimal value corresponding to the size of a recording medium when the recording time interval is increased.

It is still another object of the present invention to provide an image recording method and apparatus capable of improving recording image quality and preventing formation of a white stripe or the like at the start of image data recorded in units of predetermined amounts.

It is still another object of the present invention to provide an image recording apparatus capable of changing the execution state of multi-scan in correspondence with a change in recording time interval, properly maintaining the temperature of a heater, and improving recording image quality.

The above and other objects, features, and advantages of the present invention will be apparent from the following detailed description in conjunction with the accompanying drawings.

BRIEF DESCRIPTION OF THE DRAWINGS

FIG. 4 is a flow chart showing an operation of the sub-CPU of the first embodiment of the present invention;

FIG. 5 is a flow chart showing an operation of a main-CPU of the second embodiment of the present invention;

FIG. 6 is a flow chart showing an operation of a sub-CPU of the second embodiment of the present invention;

FIG. 12 is a timing chart showing a temperature detection timing according to the fifth embodiment of the present invention;

DETAILED DESCRIPTION OF THE PREFERRED EMBODIMENTS

Preferred embodiments of the present invention will be described in detail with reference to the accompanying drawings.

A general description of this embodiment will be briefly given prior to a description of the first embodiment of the present invention.

A facsimile apparatus of this embodiment has a reception buffer for temporarily storing a received image signal. In an ECM receive mode or the like, when the amount of received image signal stored in the reception buffer reaches a predetermined data amount (to be referred to as one block hereinafter), the received image data of one block is printed. At the first portion of one-block data, the temperature rise characteristics of heating resistors of a thermal head are improved so as not to delay a printing timing with respect to a trigger pulse to a paper feed motor. When the first portion of one-block data is to be printed, image quality degradation caused by a decrease in color development density of recording paper by an excessive decrease in temperature of the heating resistors can be prevented.

In the above facsimile apparatus, when the time interval between the printing timings is increased, a strobed signal is kept supplied to the thermal head for a predetermined period of time within the time interval between the printing timings, thus performing multi-scan (to be also referred to as sub-scan hereinafter) and hence preventing degradation of image quality.

Figure 1:
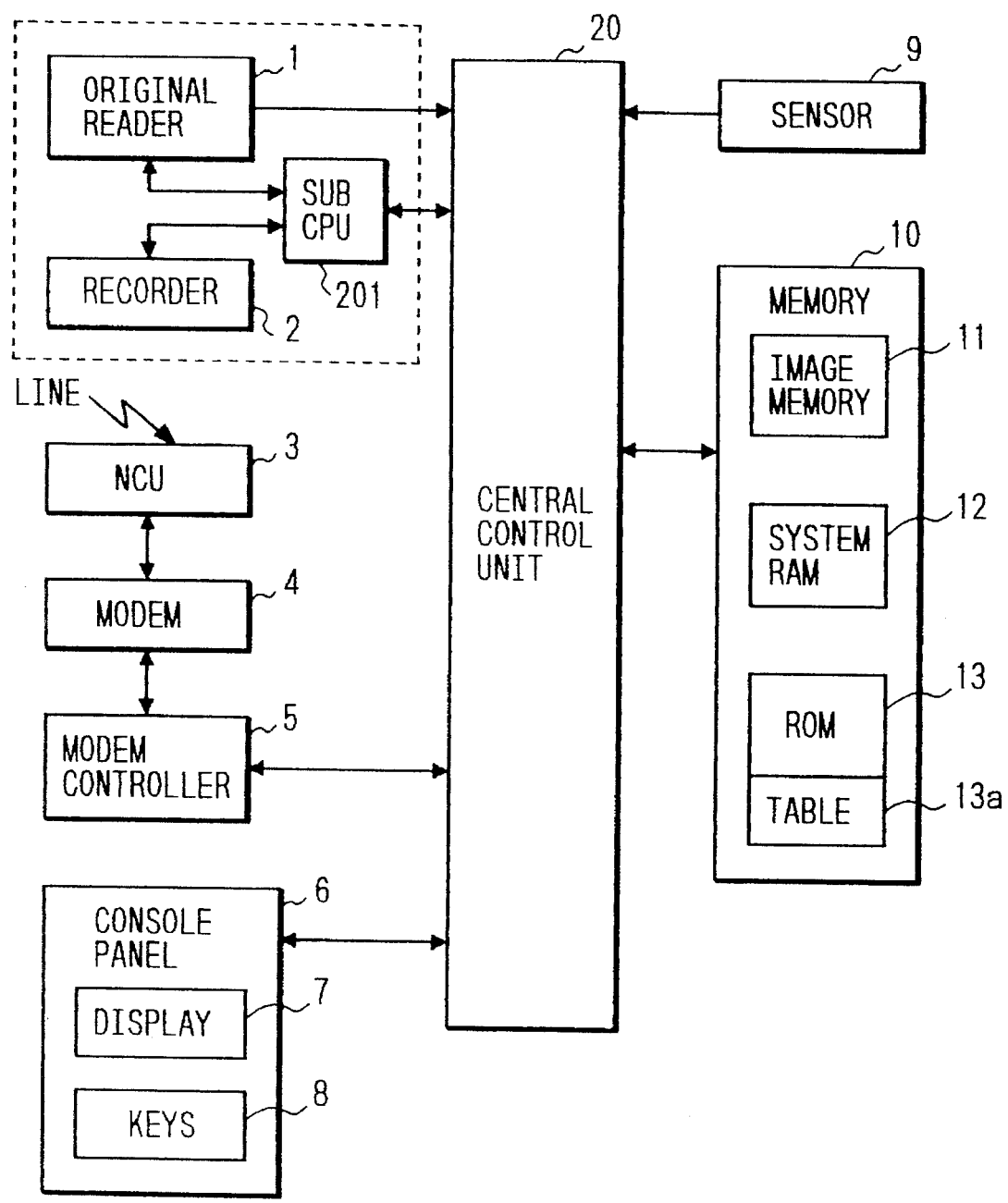
FIG. 1 is a block diagram showing an overall arrangement of a facsimile apparatus according to an embodiment of the present invention.

FIG. 1 is a block diagram showing an overall arrangement of the facsimile apparatus of this embodiment.

Referring to FIG. 1, an original reader 1 reads a transmission original and outputs image data. A recorder 2 records an image received by the facsimile apparatus through a transmission line, image data read through the original reader 1, a communication result report, or the like. The original reader 1 and the recorder 2 are controlled by a sub-CPU 201 shown in FIG. 2. A network control unit (NCU) 3 executes a communication protocol with a telephone line to transmit or receive a facsimile image. The facsimile apparatus includes a modulator/demodulator (modem) 4 for performing communication, and a modem controller 5 for controlling the modem 4. A console panel 6 includes a display 7 for displaying a state of the facsimile apparatus to a user, and operation keys 8, operated by the user, for instructing various operations to the facsimile apparatus of this embodiment.

A sensor 9 detects each operation state of the facsimile apparatus and outputs a detection signal to a central control unit 20. A memory 10 includes an image memory 11 which can store received image data and image data obtained by reading the original and serves as a buffer for temporarily storing received image data in an ECM receive mode or the like, a system RAM (or system memory) 12, backed up by a battery or the like, for storing various data in a nonvolatile manner, and a ROM 13 for storing a control program of the central control unit 20 and a table 13a for storing a multi-scan count (or the number of times of multi-scans) corresponding to each recording paper size (to be described later). The central control unit 20 includes a main CPU and controls the respective components described above.

The facsimile apparatus of this embodiment has a mode for printing data when received image data is temporarily stored in the reception buffer and the amount of received image data reaches a predetermined data amount (one block) in the ECM receive mode or the like. This reception buffer is included in the image memory 11. The ECM (Error Correction Mode) is an error correction scheme complying with the CCITT recommendations and allows image data reception or transmission without any line omissions. ECM schemes are classified into an image error retransmission scheme by half-duplex communication and an image error retransmission scheme by full-duplex communication.

In the ECM scheme using half-duplex communication, image data is divided into blocks, and each block is divided into frames. At the receiving end, every time one frame is received, error discrimination is performed. This operation is repeated until data of one block or one page is completely received. At the end of one-block reception, if an error frame is detected, a request for retransmitting the error frame is sent to a transmitting end. Upon reception of this retransmission request, the transmitting end retransmits only a frame corresponding to the error. When transmission and reception of the normal image data are confirmed, transmission of the next data block is started.

In the ECM scheme by full-duplex communication, image data is transmitted in units of predetermined frames. At a receiving end, error detection is performed in units of received frames. When an error frame is detected, data transmission of image data at the transmitting end is immediately stopped, and a request for retransmitting the error frame is sent. At the transmitting end, image data is retransmitted from the error frame.

One frame consists of a field for storing a frame number, a field for storing image data, and a field for storing error check data. Error detection is performed on the basis of whether this error check data (CRC) is accurately received, and on the basis of continuity of the frame numbers received. In this embodiment, one frame consists of 256 bytes, and one block consists of 0 to 255 frames.

Figure 2:
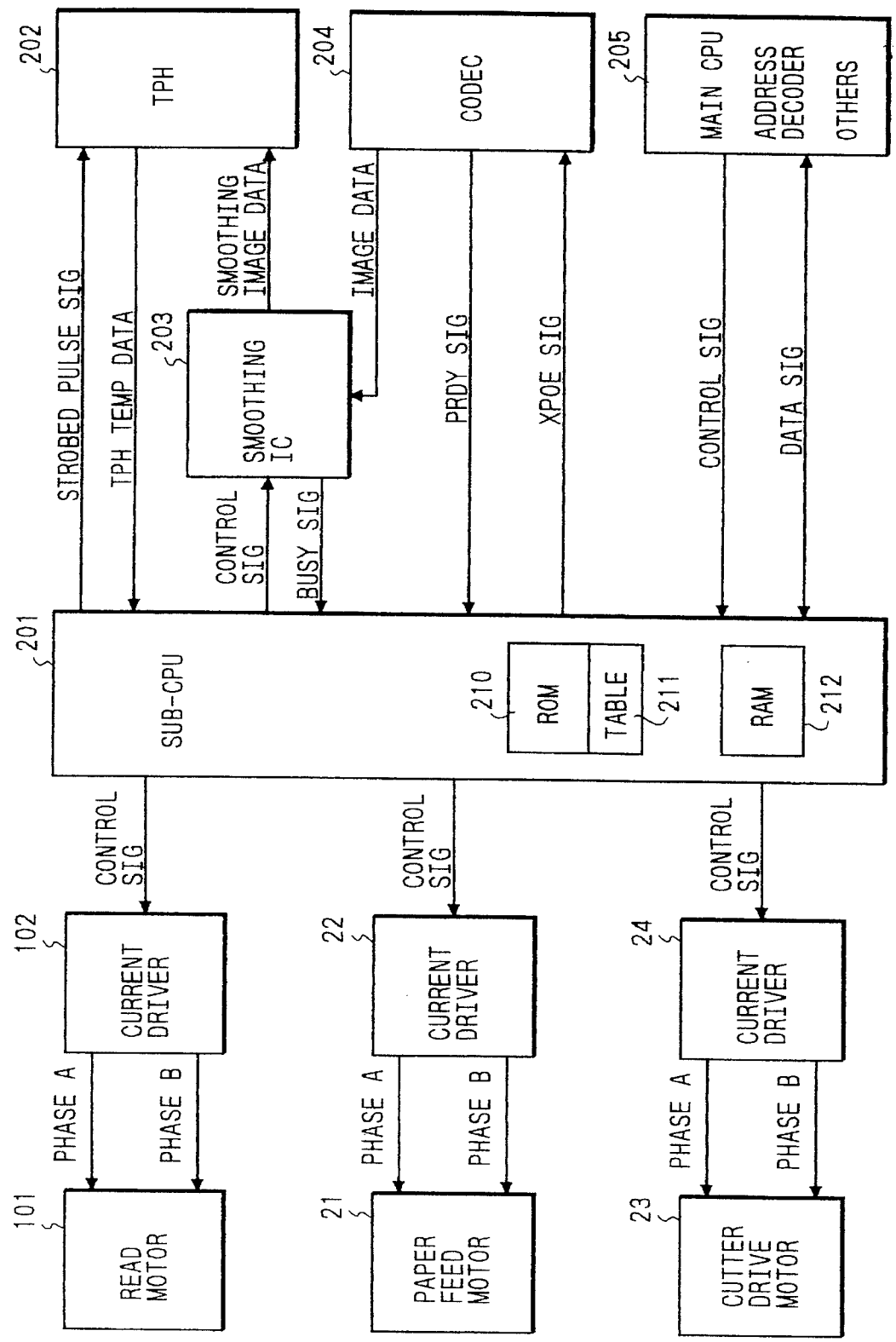
FIG. 2 is a block diagram showing an arrangement of a sub-CPU and its peripheral circuits in the facsimile apparatus of the embodiment shown in FIG. 1.

FIG. 2 is a block diagram showing the peripheral arrangement of the sub-CPU 201 for controlling the original reader 1, the recorder 2, and other circuits of the facsimile apparatus of this embodiment.

Referring to FIG. 2, a read motor 101 belongs to the original reader 1 to move a transmission original to a read position of a CCD. A current driver 102 supplies a current necessary to rotate and drive the read motor 101. A paper feed motor 21 feeds heat-sensitive recording paper. The paper feed motor 21 changes the relative positional relationship between the recording paper on which an image is to be recorded, and heating resistors of a thermal head 202. A current driver 22 supplies a necessary current to rotate and drive the paper feed motor (write motor) 21. A cutter drive motor 23 drives a cutter to cut a roll of recording paper by a length corresponding to an image recorded on the recording paper. A current driver 24 supplies a necessary current to rotate and drive the cutter drive motor 23.

The sub-CPU 201 controls energization of the heating resistors of the thermal head 202 and various motors in accordance with a control program stored in a ROM 210. The thermal head 202 is a full-line head having a plurality of heating resistors corresponding to a maximum printing width. The ROM 210 stores a table 211 which stores the pulse width of a strobed signal applied to the thermal head 202 in accordance with the temperature of the thermal head 202 and the size of recording paper. A smoothing IC 203 interpolates image data between the lines to improve the quality of the recorded image. A coder/decoder (codec) 204 decodes coded data (facsimile signal) sent from a remote facsimile apparatus to obtain original image data and codes image data read by the original reader 1. A circuit arrangement 205 includes the main-CPU of the central control unit 20, address decoders as its peripheral circuits, and others.

Figure 3:
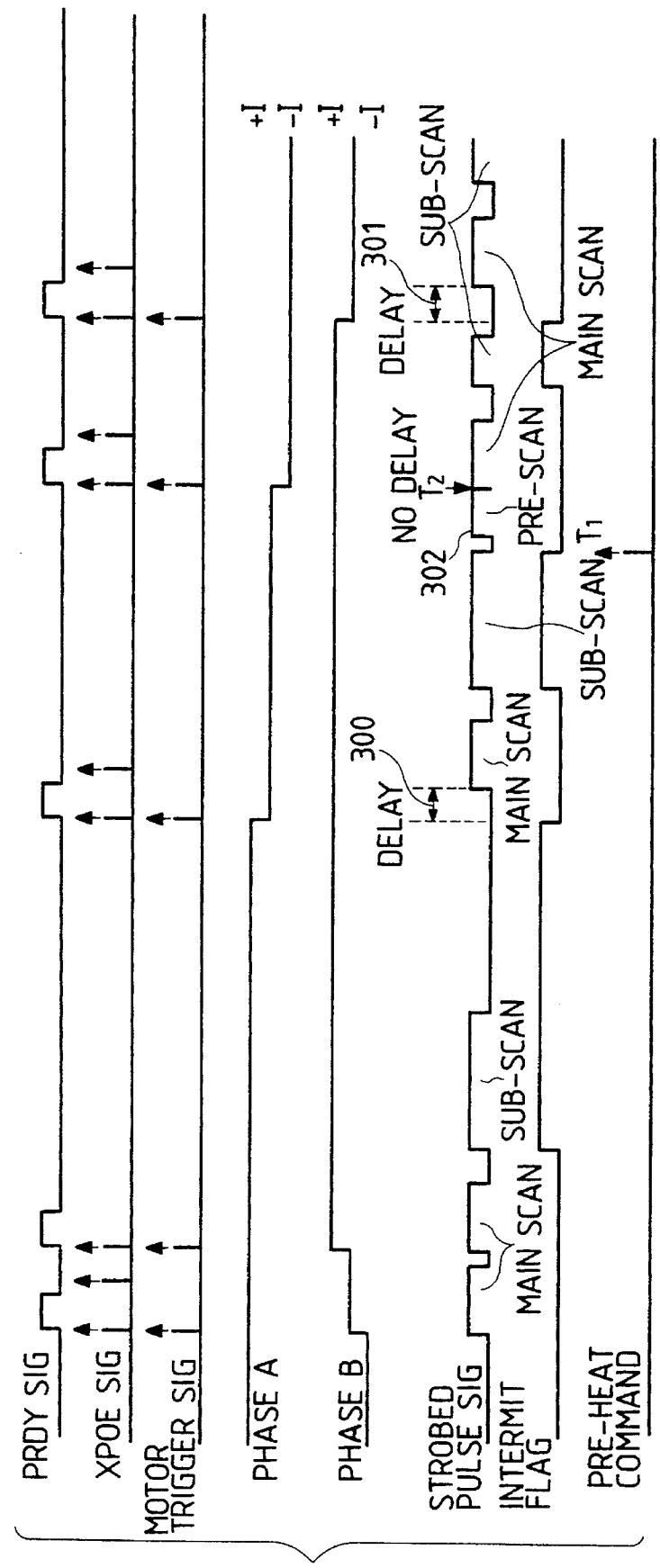
FIG. 3 is a timing chart showing output timings of various signals in the facsimile apparatus of the first embodiment of the present invention.

FIG. 3 is a timing chart showing output timings of various signals in the facsimile apparatus of this embodiment.

A PRDY signal is a signal output from the codec 204 to the sub-CPU 201 and represents that data to be printed is prepared in the codec 204. An XPOE signal is a response signal output from the sub-CPU 201 in response to the PRDY signal. The codec 204 transmits the decoded image data to the smoothing IC 203 in response to the XPOE signal. When the codec 204 completely transmits the image data to the smoothing IC 203, the PRDY signal goes to low level. The XPOE signal also has a function of informing the codec 204 of the end of image data transmission. A motor trigger signal is included in a control signal sent from the sub-CPU 201 to the current driver 22. The excitation state of the paper feed motor 21 is changed by this motor trigger signal. As a result, the paper feed motor 21 performs a stepping operation to feed the recording paper by a predetermined amount.

Phases A and B represent A- and B-phase currents supplied to the paper feed motor 21 when this motor is driven with one to two phases. A pre-heat command is a command included in a control signal output from the main CPU 205 to the sub-CPU 201. When the main CPU 205 determines that the line to be printed next is the start line of a block, the pre-heat command is sent to the sub-CPU 201, as indicated by a timing $T_1$ in FIG. 3, thereby causing the sub-CPU 201 to start pre-scan. A strobed signal is a pulse signal output from the sub-CPU 201 to the thermal print head (TPH) 202. By this strobed signal, the thermal head 202 is heated, so that an image can be recorded on recording paper such as heat-sensitive paper brought into contact with the thermal head 202. When the strobed signal is supplied to the thermal head 202, the temperature of the thermal print head 202 can be kept constant. An intermit flag is a flag set in a RAM 212 in the sub-CPU 201. The intermit flag is set ON when image data from the codec 204 is not continuously sent.

The smoothing IC 203 interpolates the image data sent from the codec 204 to form interpolated data and sends the interpolated data to the thermal head 202. The thermal head 202 can print the interpolated data. For the sake of descriptive simplicity, timings obtained when such interpolation is not performed are illustrated.

FIG. 4 is a flow chart showing an operation of the sub-CPU 201 in the facsimile apparatus of this embodiment. A control program for executing this process is stored in the RAM 212.

This process is started with a recording start instruction (included in a control signal) from the main CPU 205. In step S1, a pre-heat flag in the RAM 212 is cleared. In step S2, a motor trigger signal is output to the paper feed motor 21 to start feeding the recording paper. It is determined in step S3 whether the intermit flag is ON. If YES in step S3 (when the image data is not continuously supplied from the codec 204), the flow advances to step S4 to perform scan-waiting without performing sub-scan of the thermal head 202. This scan-waiting corresponds to a delay portion of the strobed signal represented by 300 and 301 in FIG. 3. Scan-waiting corresponds to a delay process of main scan start with respect to the motor trigger signal. In step S5, the intermit flag is turned off.

The flow advances to step S6 to perform main scan for outputting a strobed signal to print image data sent from the smoothing IC 203 to the thermal head 202.

When image recording of one line is completed, the flow advances to step S7 to determine whether printing data of the next line is present. If YES in step S7, the flow advances to step S8, and printing of the next line is performed.

On the other hand, if the printing data of the next line is determined in step S7 not to be prepared, the flow advances to step S9 to turn on the intermit flag of the RAM 212. In step S10, sub-scan (or called multi-scan) is performed. When the image data is not continuously sent to the thermal head 202, i.e., when the image data transmission interval is increased, the strobed signal for printing image data is continuously output to the thermal head 202 within a predetermined period of time as an extra period, thereby increasing the image printing density.

The flow advances to step S11 to determine whether printing data of the next line is present, i.e., whether the PRDY signal is input. If the PRDY signal is at high level, i.e., if the printing data is present, the flow advances to step S8 to perform printing of this line. Otherwise, the flow advances to step S12 to determine whether a pre-heat command is received from the main CPU 205. In a mode for printing data when the received image data is temporarily stored in a buffer and the amount of the stored data reaches a predetermined data amount (one block) in the ECM receive mode or the like, the main CPU 205 sends the pre-heat command to the sub-CPU 201 when one-block printing is completed and image data of the next block is stored in the buffer.

Upon reception of this pre-heat command, the sub-CPU 201 turns off the intermit flag in step S13 and turns on the pre-heat flag in step S14. The flow advances to step S15 to determine whether sub-scan is completed. If YES in step S15, the flow advances to step S16 to determine whether the pre-heat flag is ON. If YES in step S16, the flow advances to step S17 to continuously supply small pulses to the heating resistors of the thermal head 202 so as to maintain the temperature of the heating resistors constant (pre-scan 302 in FIG. 3). The temperature of the heating resistors maintained by this pre-scan is much lower than the temperature of the heating resistors in actual printing.

The main-scan start timings are delayed with respect to the motor trigger signals by the intermit flags (FIG. 3), as indicated by 300 and 301. More specifically, when the trigger interval is increased, the paper feed motor performs an intermittent operation. There is a time delay between a timing when the motor excitation signal is changed by the motor trigger signal and a timing when rotation of the paper feed motor 21 is actually started, as compared with a case wherein the motor trigger signals are continuously received. For this reason, the delay times 300 and 301 in FIG. 3 are provided until main scan is performed after the motor trigger signal is input.

Thereafter, when the PRDY signal is sent from the codec 204, the flow advances from step S11 to step S8. Even if the paper feed motor 21 is intermittently operated, the motor delay (scan-wait) operation is not performed. The main scan is started at almost the same timing as the output timing of the motor trigger signal (timing T2 in FIG. 3). Therefore, the decrease in temperature of the heating resistors of the thermal head 202 at the start line of the block can be prevented, and the recording image quality can be improved.

FIGS. 5 and 6 are flow charts of processing of a main CPU 205 and processing of a sub-CPU 201 in a facsimile apparatus according to another embodiment.

Referring to FIG. 5, when the main CPU 205 determines in step S21 that an ECM receive mode is set, the flow advances to step S23 to forcibly set a flag so as to inhibit a scan-wait operation. In step S24, this flag information is transmitted to the sub-CPU 201.

In the flow chart of FIG. 6, when the sub-CPU 201 inputs flag information to inhibit a scan-wait operation in step S31, the flow advances to step S33 to disable the scan-wait function so as to inhibit the scan-wait operation.

The same effect as the previous embodiment can be obtained in this embodiment with a simple arrangement.

This embodiment exemplifies a facsimile apparatus having an ECM receive mode. However, the present invention is not limited to this. The present invention is also applicable to an apparatus having a buffer capable of storing image data to print the stored image data by heating and driving heater resistors of a thermal print head or the like. By executing this process, a tremendous effect can be obtained particularly for a halftone image.

The embodiment described above has the following effects.

In the facsimile apparatus having a buffer capable of temporarily storing a received image signal to print one block of received image data when the amount of received image data stored in the buffer reaches a predetermined data amount (to be referred to as one block), the printing timing is delayed with respect to the paper feed motor trigger when the time interval between the printing timings is increased. At the first portion of one-block printing, the delay of the printing timing is inhibited to improve the temperature rise characteristics of the heating resistors of the recording head, thereby preventing degradation of image quality (formation of a white stripe) caused by a decrease in color development density of recording paper at the first portion of one-block printing.

When the time interval between the printing timings in the facsimile apparatus is increased, a strobed signal is kept supplied to the thermal head for a predetermined period of time within the time interval between the printing timings so as to maintain the temperature of the recording head constant, thereby preventing image quality degradation caused by inhibition of the delay of the printing timing.

The third and fourth embodiments of the present invention will be described below.

A general description of these embodiments will be made prior of a detailed description thereof.

When the time interval between recording cycles for recording image data is increased, a strobed pulse count is increased to maintain the temperature of heating resistors for recording an image constant. That is, multi-scan (to be also referred to as sub-scan) is performed. Whether the sub-scan count or its maximum value is increased, i.e., whether sub-scan is performed is determined in accordance with a size A4 or B4 of recording paper. Even if the size of the recording paper is changed, multi-scan parameters can be optimized. That is, multi-scan can be optimized in consideration of an influence of the recording paper size on vibrations of the recording paper.

In these embodiments, in a facsimile apparatus having a reception buffer for temporarily storing a received image signal to send the received image data of one block when the amount of received image signal data stored in the reception buffer reaches a predetermined data amount (to be referred to as one block hereinafter) in an ECM receive mode or the like, a strobed signal consisting of small pulses is kept supplied to heating resistors of a recording head between a timing when one-block printing is completed and a timing when printing of the next block is started, thereby maintaining the heating resistors at a predetermined temperature. When the start line of the next block is to be printed, the heating resistors are heated and driven for a predetermined period of time at a magnitude not to cause printing or a degree of printing by the data of the last line of the previous block. Subsequently, a motor (to be referred to as a paper feed motor) for moving the recording paper serving as a recording medium is rotated to sequentially print data of the next block. At this time, an excessive decrease in temperature of the heating resistors can be prevented to eliminate formation of a white stripe.

Recording head temperature data detected during printing of all the lines of the previous block are held. The temperature of the recording head during execution of pre-heat of the heating resistors for a non-printing time between the blocks is detected and compared with the stored temperature data. If a difference in the temperature data falls within a predetermined range, the pre-heat process is interrupted, and printing of the next block is started to prevent application of unnecessary energy to the heating resistors and eliminate formation of black stripes between the blocks.

The overall arrangement of the facsimile apparatus of the third and fourth embodiments is the same as that in FIGS. 1 and 2, and a detailed description thereof will be omitted.

Figure 7:
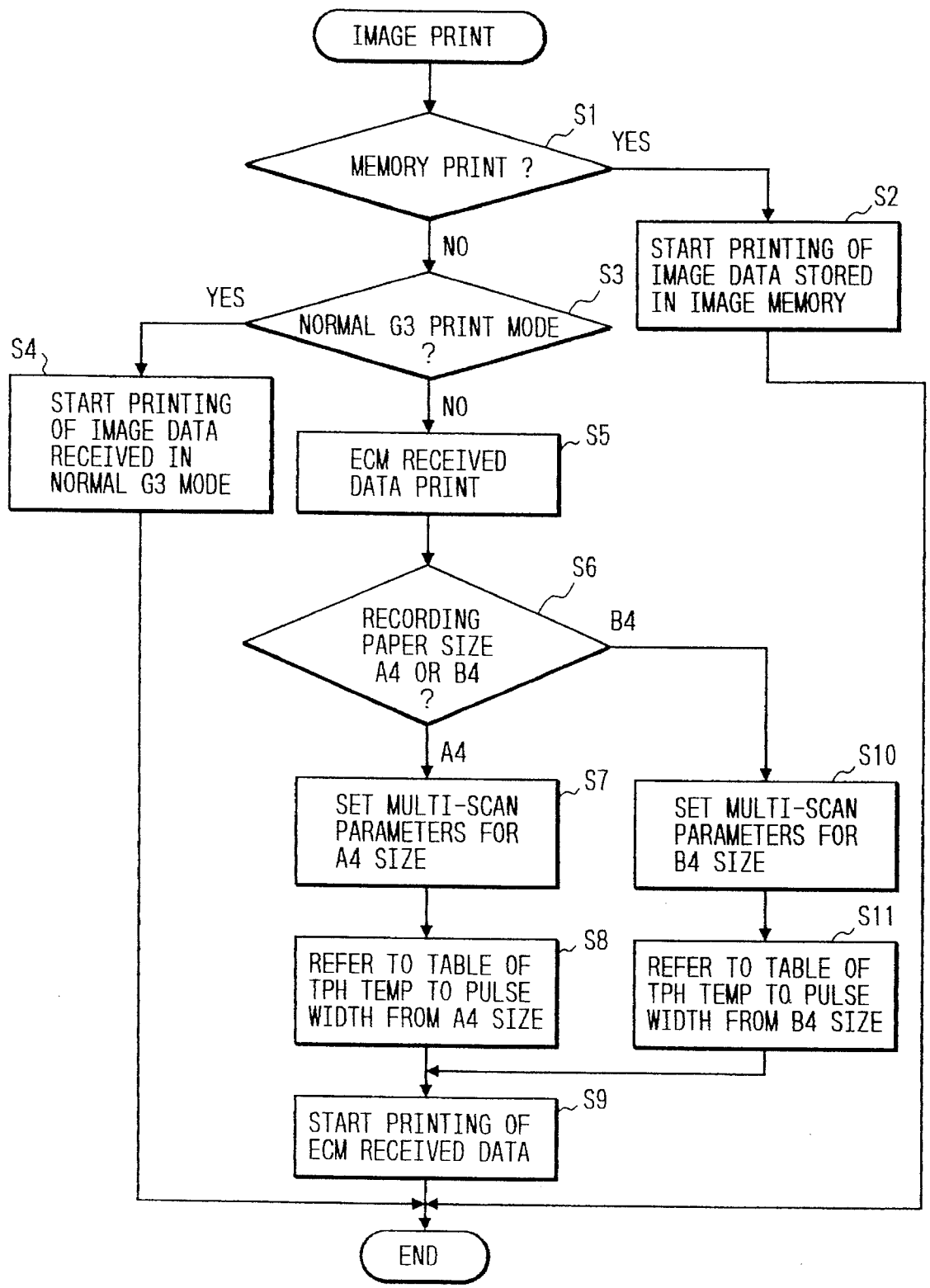
FIG. 7 is a flow chart showing a control sequence of a central control unit in a facsimile apparatus according to the third embodiment of the present invention.

FIG. 7 is a flow chart showing a process of a central control unit 20 in the facsimile apparatus of the third embodiment of the present invention when a received image is recorded. A control program for executing this process is stored in a ROM 13.

The process in FIG. 7 is started in a facsimile receive mode. It is determined in step S1 whether a memory print mode for printing image data stored in an image memory 11 is set. If YES in step S1, the flow advances to step S2 to sequentially read out data from the image memory 11 and print them. In this case, the time interval between the lines in the image recording mode will not be prolonged, and printing can be performed at a constant speed.

If NO in step S1, the flow advances to step S3 to determine whether a normal G3 print mode is set. If YES in step S3, the flow advances to step S4 to perform normal G3 print mode for recording image data received in the normal G3 print mode.

If NO in step S3, the flow advances from step S3 to step S5 and then step S6 to determine whether the recording paper size is an A4 or B4 size. If the recording paper size is determined to be the A4 size, the flow advances to step S7 to set multi-scan parameters such as a maximum value of a multi-scan count (or time) to a value corresponding to the A4 size. This value is pre-stored in a table 13a of the ROM 13. The flow then advances to step S8 to inform to the sub-CPU 201 that the recording paper has the A4 size and an image to be recorded next is ECM received data. The temperature of a thermal head 202 is checked, and the pulse width of a signal applied to the thermal head 202 is determined in correspondence with the detected temperature and the recording paper size of A4 with reference to a table 211.

On the other hand, when the recording paper size is B4, the flow advances to step S10 to set the multi-scan parameters such as the maximum value of the multi-scan count (or time) to a value corresponding to the B4 size. This value is pre-stored in the table 13a of the ROM 13. The flow then advances to step S11 to inform to the sub-CPU 201 that the recording paper size is the B4 size and image data to be recorded next is ECM received data. The sub-CPU 201 checks the temperature of the thermal head 202 and determines the pulse width of a signal applied to the thermal head 202 in correspondence with the detected temperature and the recording paper size of B4 with reference to the table 211.

The flow advances to step S9 to start printing the ECM received data.

Figure 8:
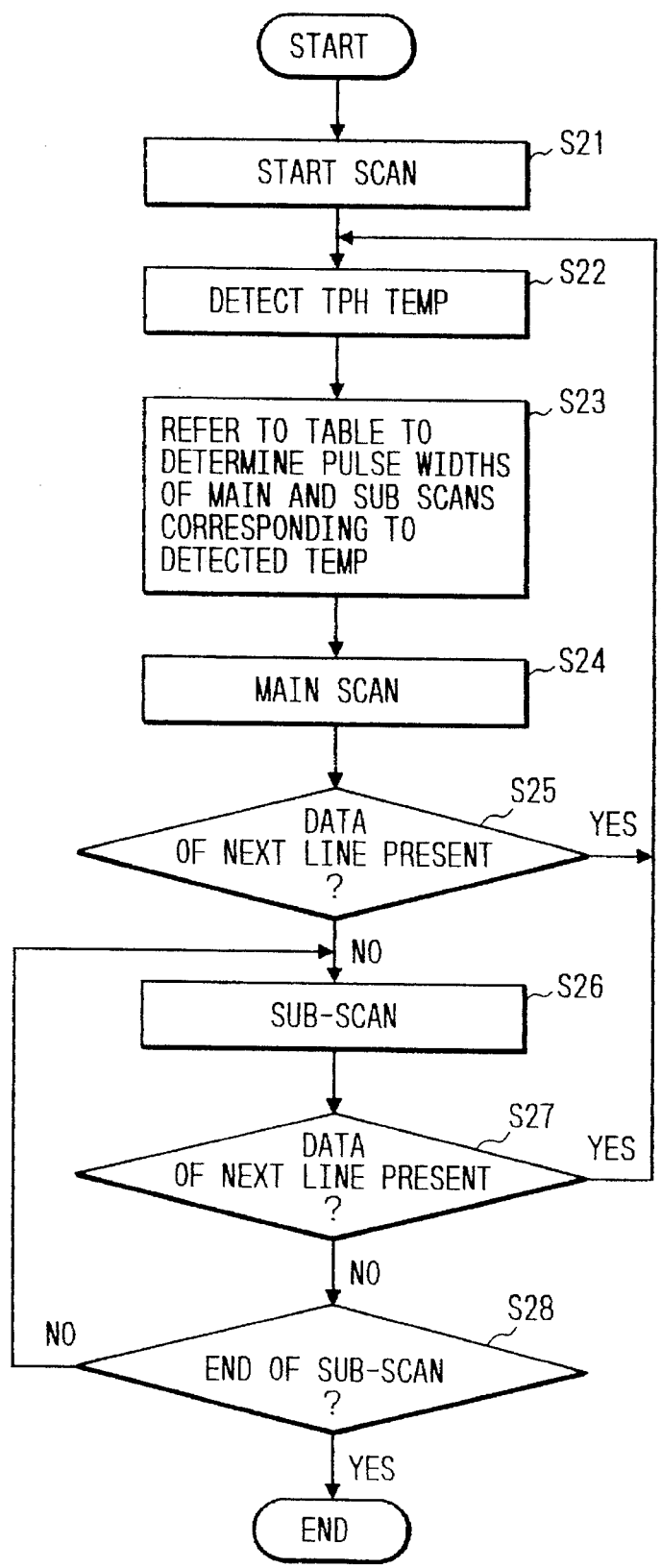
FIG. 8 is a flow chart showing a control sequence of a sub-CPU of the facsimile apparatus according to the third embodiment.

FIG. 8 is a flow chart showing an operation of the sub-CPU 201 in recording of the received image in the facsimile apparatus of this embodiment. This process is started when a print instruction is input from the central control unit 20. In step S21, sub-scan for energizing the heating resistors of the thermal head 202 is started. The flow advances to step S22 to detect the temperature of the thermal head 202. In step S23, the energization pulse widths of signals in the main scan and sub-scan corresponding to the temperature of the thermal head 202 and the recording paper size are determined with reference to the table 211. The flow then advances to step S24 to heat and drive the thermal head 202 in accordance with image data corresponding to the determined energization pulse widths, thereby recording an image of one line.

The flow advances to step S25 to check in accordance with the PRDY signal from a codec 204 that the recording data of the next line is prepared. If the PRDY signal is ON, the flow returns to step S24 to perform image recording described above.

On the other hand, if recording data of the next line is absent in step S25, the flow advances to step S26 to perform sub-scan for energizing to maintain the temperature of the heating resistors of the thermal head 202 constant. It is determined in step S27 as in step S25 whether recording data of the next line is prepared. If NO in step S27, the flow advances to step S28 to determine whether the sub-scan is performed by the count determined in step S23. If NO in step S28, the flow returns to step S26, and the above-mentioned process is repeated.

Figure 9:
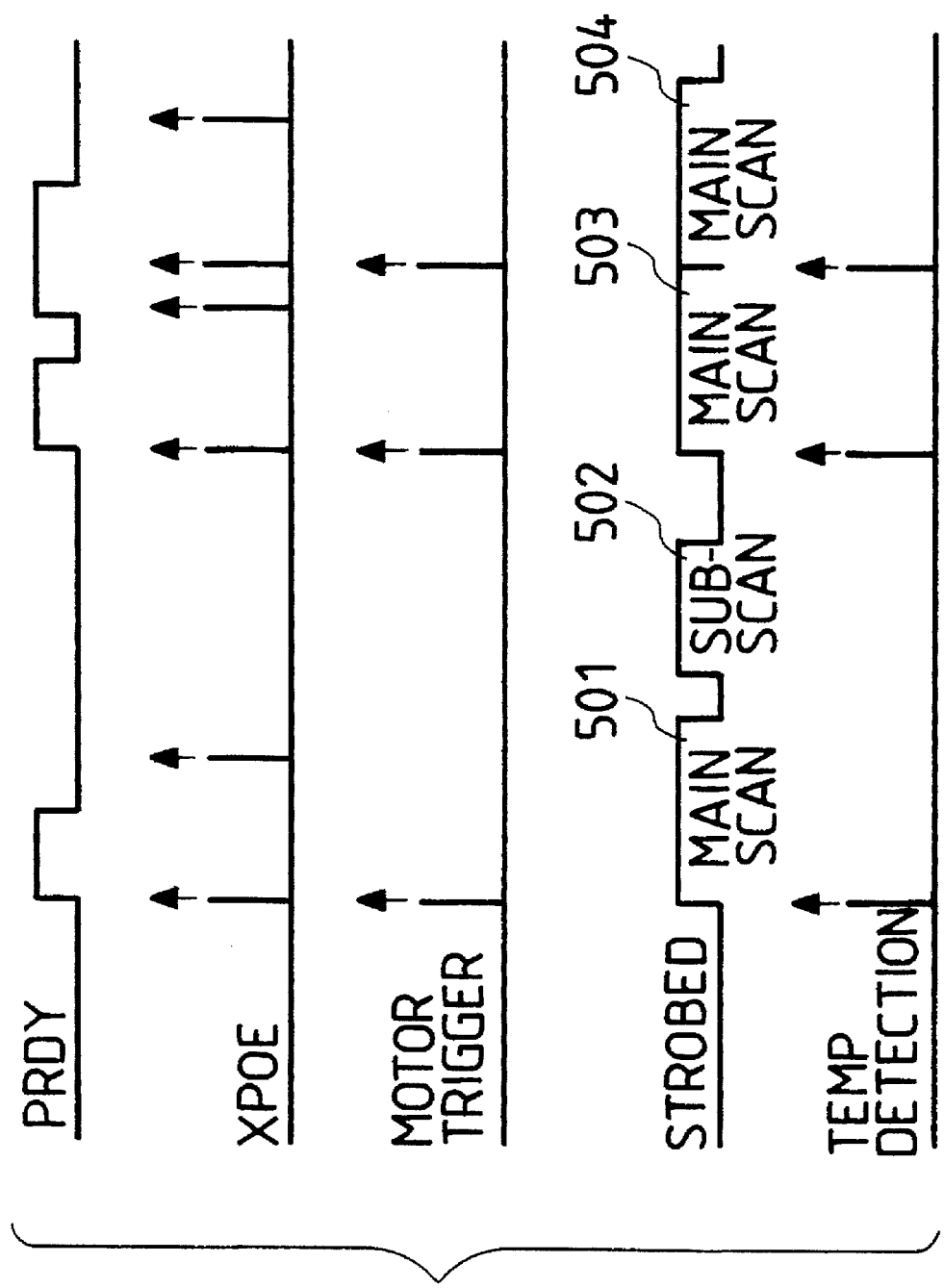
FIG. 9 is a timing chart showing timings of various input/output signals with respect to a sub-CPU of the facsimile apparatus of the third embodiment.

FIG. 9 is a timing chart for explaining the main scan and the sub-scan performed in the facsimile apparatus of this embodiment.

A PRDY (printer ready) signal is a signal output from the codec 204 in FIG. 2 to the sub-CPU 201. When the PRDY signal is set at high level, it indicates that image data to be recorded next is present. An XPOE signal is a response signal output from the sub-CPU 201 to the codec 204 in response to the PRDY signal. The XPOE signal allows transmission of the recording data from the codec 204 to a smoothing IC 203. The PRDY signal is disabled when the recording data is completely transmitted from the codec 204 to the smoothing IC 203. The XPOE signal also has a function of informing the end of transmission from the sub-CPU 201 to the codec 204.

A motor trigger signal is included in a control signal supplied from the sub-CPU 201 to a current driver 22. The excitation state of a paper feed motor 21 is changed by this motor trigger signal. As a result, the paper feed motor 21 performs a stepping operation to feed the recording paper by a recording width. A strobed signal is a pulse signal (energization signal) supplied from the sub-CPU 201 to the thermal head 202. The thermal head 202 is heated by this strobed signal, so that an image can be formed on recording paper such as heat-sensitive paper brought into contact with the thermal head 202. In a sub-scan mode, this strobed signal is applied as a pulse signal for maintaining the temperature of the thermal head 202 constant.

Main-scan portions (501, 503, and 504) of this strobed signal constitute a strobed signal for heating and driving the heating resistors to actually record an image on the basis of image data supplied to the thermal head 202. A sub-scan (multi-scan) portion 502 is provided to continuously supply a strobed signal to record image data within a predetermined period of time serving as an extra time when the interval between the image data transmission cycles is increased. Therefore, the recording density of the image data can be increased.

As is apparent from FIG. 9, since the time interval is large between the main-scan 501 (image recording of one line) and recording 503 of the next line, the sub-scan represented by the portion 502 is executed to prevent a decrease in temperature of the thermal head 202. Since almost no interval is formed between the main scan 503 and the main scan 504, no sub-scan is performed and the main scan 504 is immediately performed.

The temperature detection timing is a timing for detecting the temperature of the heating resistors of the thermal head 202 so as to optimize the pulse widths of the main scan and the sub-scan to match with the temperature of the heating resistors. In this case, the temperature detection timing is obtained in synchronism with the main scan timing. Note that the table for determining the energization pulse width corresponding to the temperature of the heating resistors is stored in the table 211 of a ROM 210.

The smoothing IC 203 generates interpolated data between the image data sent from the codec 204 and supplies the interpolated data to the thermal head 202. The thermal head 202 is driven by the interpolated data to perform recording. For the sake of descriptive simplicity, FIG. 9 shows timings obtained when such interpolation is not performed.

Figure 10:
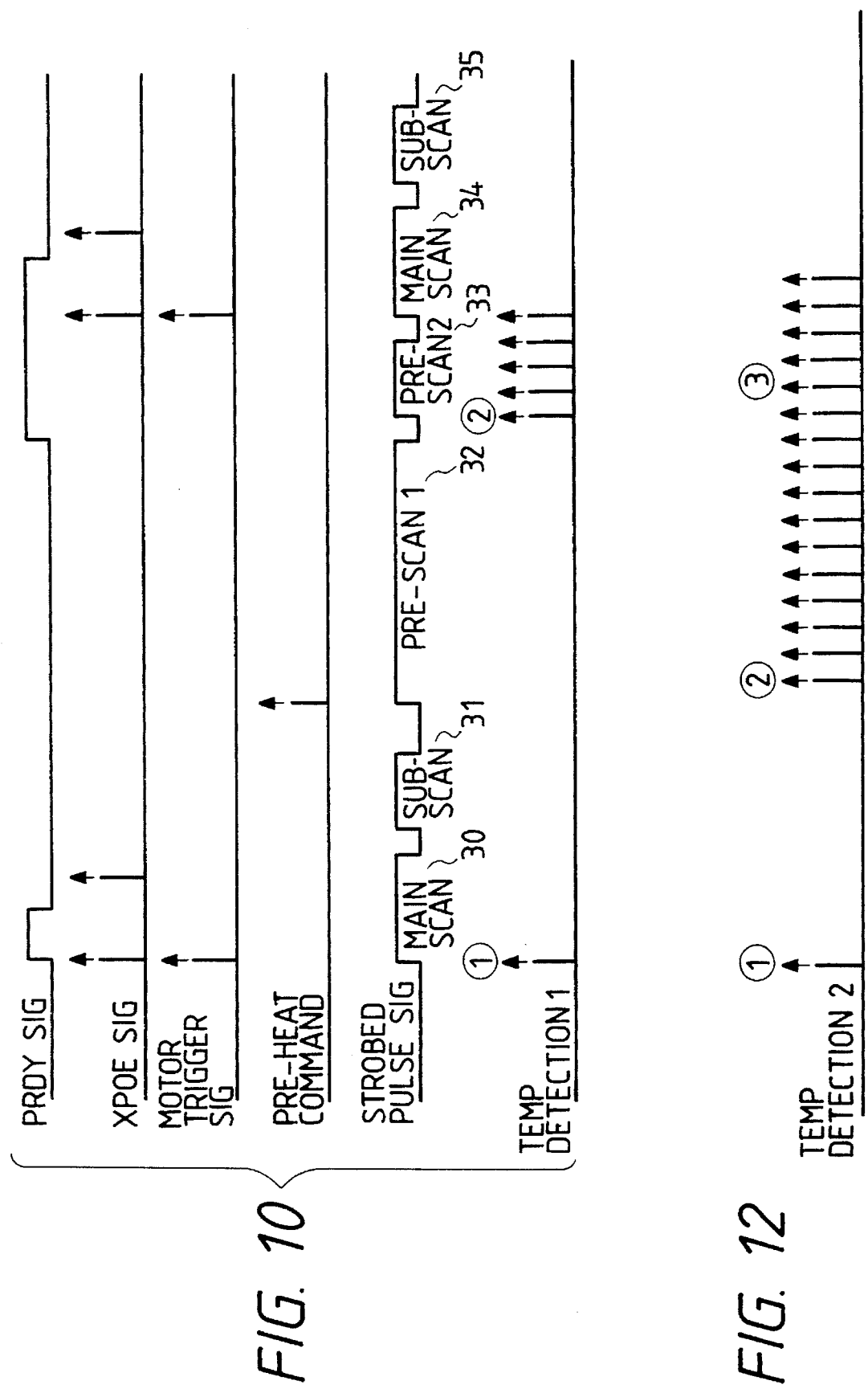
FIG. 10 is a timing chart showing output timings of various signals in a facsimile apparatus according to the fourth embodiment of the present invention.

FIG. 10 is a timing chart showing operation timings of the facsimile apparatus according to the fourth embodiment of the present invention.

Referring to FIG. 10, a PRDY signal (ready signal) is a signal transmitted from a codec 204 (FIG. 2) to a sub-CPU 201, as described above. When the PRDY signal is set at high level, the PRDY signal represents that data to be printed is present in the codec 204. An XPOE signal is a response signal output from the sub-CPU 201 to the codec 204 in response to the PRDY signal, thereby allowing the codec 204 to transmit the print data to a smoothing IC 203. When the codec 204 completely transmits this print data to the smoothing IC 203, the PRDY signal goes to low level. The XPOE signal has a function of informing to the codec 204 that the sub-CPU 201 confirms the end of transmission of the print data.

A motor trigger signal is included in a control signal supplied from the sub-CPU 201 to a driver 22 of a paper feed motor 21. The excitation state of the paper feed motor 21 is changed by this motor trigger signal. As a result, the paper feed motor 21 performs a stepping operation. A pre-heat command is included in a control signal sent from a main CPU 205 to the sub-CPU 201. When the main CPU 205 determines that a line to be printed next is the start line of a block, the pre-heat command is output to the sub-CPU 201.

A strobed signal is a pulse signal output from the sub-CPU 201 to a thermal head (TPH) 202. The thermal head 202 is heated by this strobed signal, so that an image can be printed on recording paper such as heat-sensitive paper brought into contact with the thermal head 202. Therefore, the temperature of the thermal head 202 is kept constant. Referring to FIG. 10, the strobed signal has main heat pulses 30 and 34 for actual printing, sub-heat pulses 31 and 35, and pre-scan heat pulses 32 and 33. Finally, the temperature detection timing is a timing for detecting the temperature of the thermal head 202. The sub-CPU 201 determines an optimal pulse width of the strobe signal on the basis of the detected temperature data.

The smoothing IC 203 generates interpolated data between image data supplied from the codec 204 and transmits the interpolated data to the thermal head 202. The thermal head 202 can print the interpolated data. In this embodiment, however, the timings obtained when such interpolation is not performed are illustrated.

Figure 11:
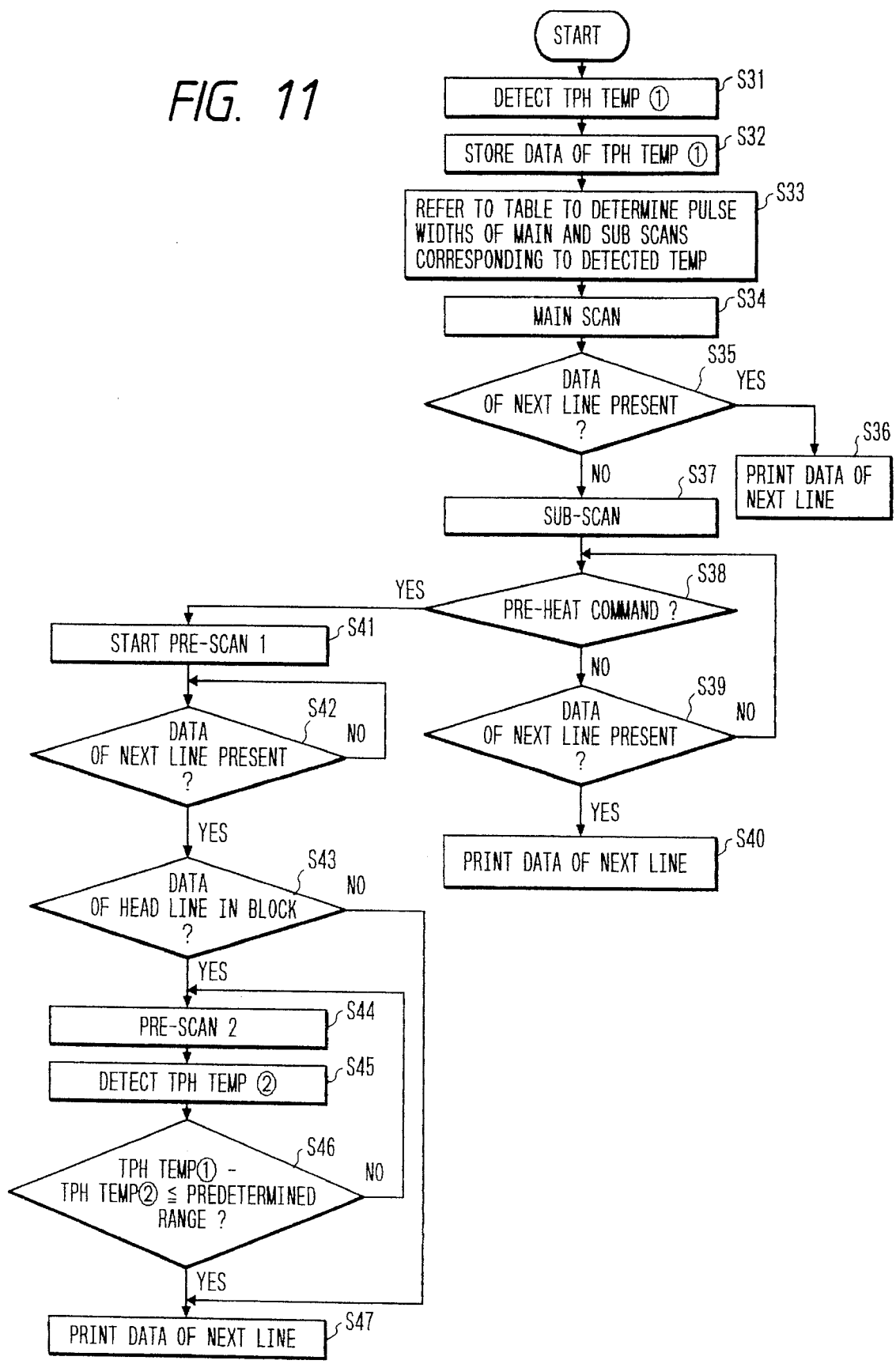
FIG. 11 is a flow chart showing an operation of a sub-CPU according to the fourth embodiment of the preset invention.

The operation of the sub-CPU 201 of the facsimile apparatus of the fourth embodiment of the present invention will be described with reference to a flow chart in FIG. 11. A control program for executing this process is stored in a ROM 210. Referring to FIG. 11, in the main scan, a strobed signal for printing image data sent to the thermal head (TPH) 202 is supplied. In the sub-scan (or called multi-scan), when image data is not continuously supplied to the thermal head, i.e., when the interval between the image data transmission cycles is large, the strobed signal for printing image data is continuously supplied within a predetermined period of time as an extra time. Therefore, the image printing density can be increased.

The facsimile apparatus of the fourth embodiment has a mode for printing one-block data when received image data is temporarily stored in a reception buffer and the received image data stored in the reception buffer reaches a predetermined data amount (one block) in the ECM receive mode. In this mode, when one-block data is completely printed and the next encoded image data is received and stored in the reception buffer, the main CPU 205 sends a pre-heat command to the sub-CPU 201 at a timing shown in FIG. 10.

The operation of the sub-CPU 201 will be described with reference to the flow chart in FIG. 11. In step S31, temperature data of the thermal head 202 is input. This temperature data is stored in a RAM 212 (step S32). The flow advances to step S33 to determine the pulse widths of main- and sub-scan pulses corresponding to the temperature of the thermal head 202 with reference to a table 211 of the ROM 210. In step S34, the paper feed motor 21 is started in synchronism with a PRDY signal from the codec 204 and at the same time the main-scan pulse for printing is output to the thermal head 202. The flow advances to step S35 to determine whether the PRDY signal from the codec 204 is input, that is, whether recording data of the next line is present. If YES in step S35, the flow advances to step S36 to print recording data of the next line.

If NO in step S35, the flow advances to step S37 to output a sub-scan strobed signal to the thermal head 202. The flow advances to step S38 to determine whether a pre-heat command from a central control unit 20 (main CPU) is input. If NO in step S38, the flow advances to step S39 to determine whether printing data of the next line is prepared. If YES in step S39, printing is performed in step S40. However, if NO in step S39, the flow returns to step S38 to wait for a pre-heat command from the main CPU.

When a pre-heat command is received in step S38, the flow advances to step S41 for continuous supply of small pulses to the heating resistors to maintain the temperature of the heating resistors of the thermal head 202 constant (pre-scan 1 (32) in FIG. 10). The temperature of the heating resistors actuated by this pre-scan 1 is much lower than a temperature enough to cause the heating resistors to perform printing. In step S42, a PRDY signal is input from the codec 204 to inform that data to be printed next is present, and the flow advances to step S43. It is determined whether an image data signal corresponding to the PRDY signal is start line data of one block. If the image data signal corresponding to the PRDY signal does not represent the start data, the flow advances to step S47, and this line data is immediately printed. Whether the image data signal corresponding to the PRDY signal is the start data is determined by a signal or command supplied from the central control unit 20.

If the image data is the start data of one block, the flow advances to step S44. A strobed signal of pre-scan 2 indicated by 33 in FIG. 10 is output to the thermal head 202. This operation is performed to increase the temperature of the heating resistors of the thermal head 202 before the normal scan (main scan, or main scan and sub-scan) is started. During this pre-scan 2, the temperature of the heating resistors of the thermal head 202 is detected (step S45). It is determined in step S46 whether a difference between the detected temperature value and the temperature value stored in step S2 falls within a predetermined range. The operations in steps S44 to S46 are repeated until the temperature difference falls within the predetermined range. Thereafter, the temperature of the heating resistors of the thermal head 202 is increased to a predetermine value. The flow then advances to step S47 to rotate the paper feed motor 21 and print the next line data while recording paper is being moved.

As described above, according to the fourth embodiment of the present invention, in the main scan or sub-scan, the pulse width of the strobed pulse for energizing the thermal head 202 is optimized in accordance with the temperature of the heating resistors of the thermal head 202, which temperature is obtained prior to the start of scan. For this reason, the pulse width table 211 for a necessary temperature is stored in the ROM 210 incorporated in the sub-CPU 201.

The fifth embodiment of the present invention will be described with reference to FIGS. 12 to 14.

FIG. 12 shows a temperature detection timing executed by a sub-CPU 201 in the fifth embodiment. The temperature detection timing corresponds to temperature detection 1 in FIG. 10. Other signal timings with respect to the temperature detection timing are the same as those in FIG. 10.

Figure 13:
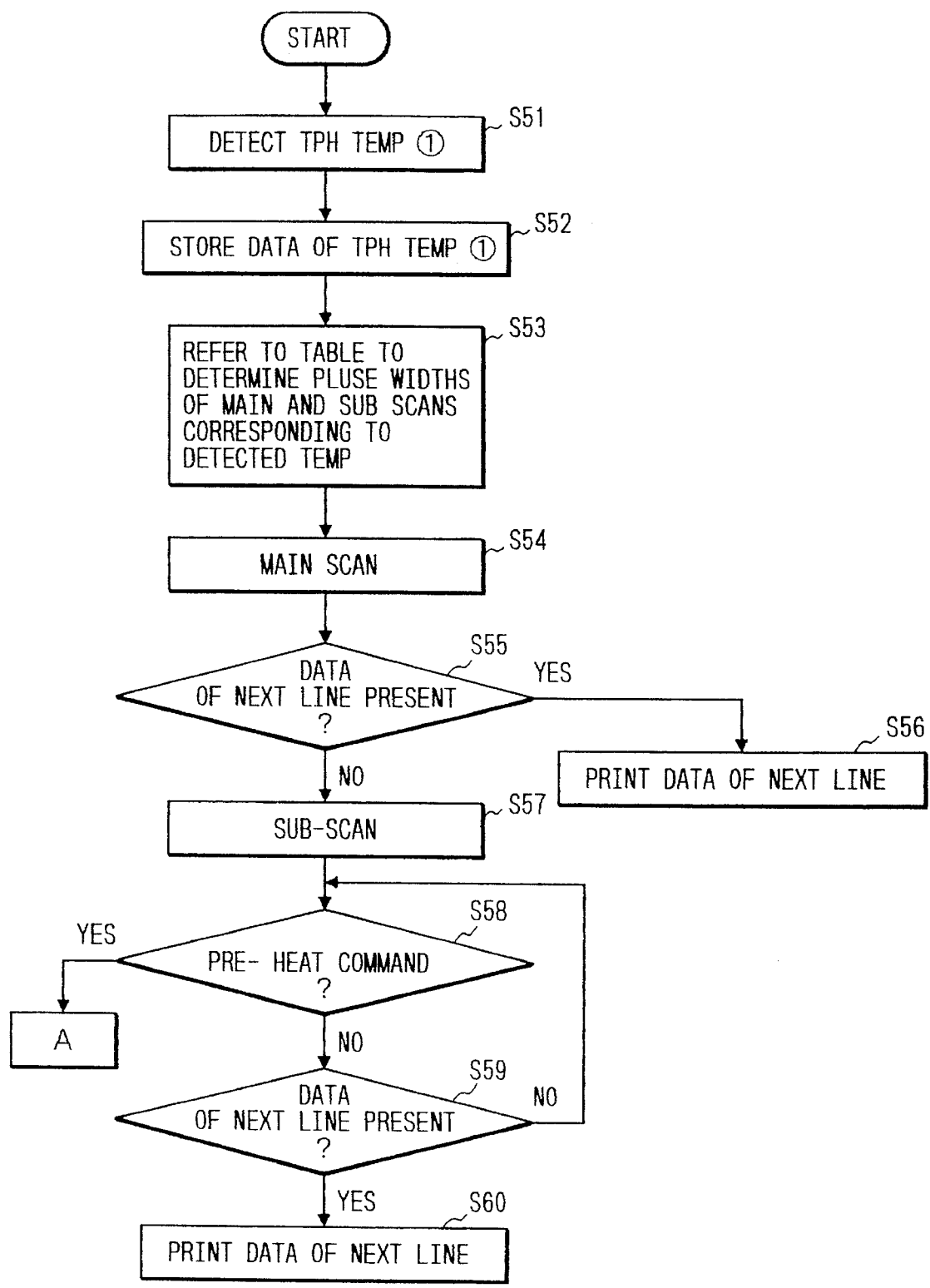
FIG. 13 is a flow chart showing an operation of a sub-CPU according to the fifth embodiment of the present invention.
Figure 14:
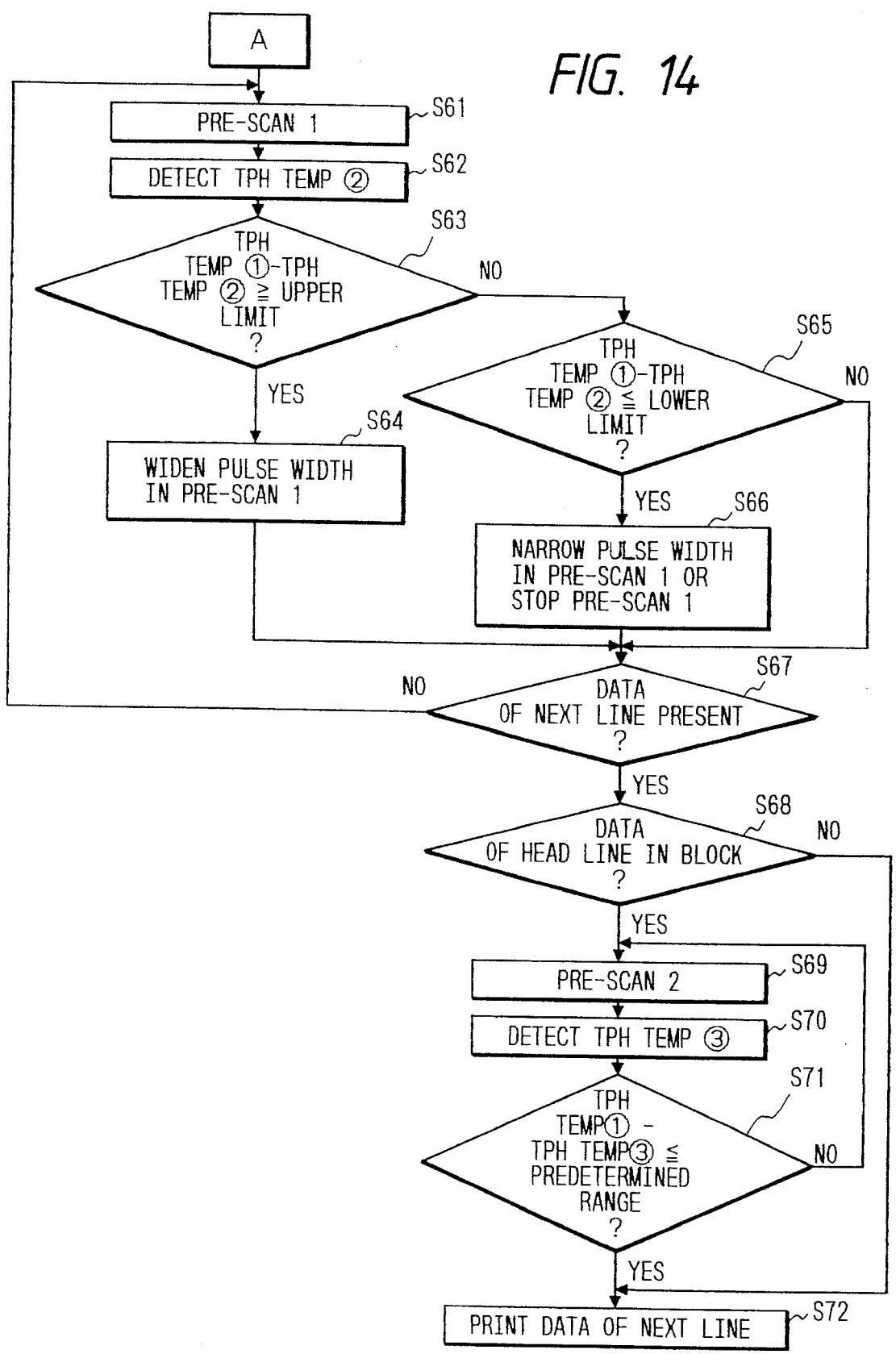
FIG. 14 is a flow chart showing an operation of the sub-CPU according to the fifth embodiment of the preset invention.

FIGS. 13 and 14 are flow charts showing the operation of the sub-CPU 201 of the fifth embodiment. In this embodiment, as shown in FIG. 12, even at a timing of pre-scan 1, the temperature of a thermal head 202 is detected, and the pulse width of pre-scan 1 is controlled using the detected temperature data.

Referring to FIG. 13, steps S51 to S60 are identical to steps S31 to S40 in FIG. 11, and a detailed description thereof will be omitted.

When a pre-heat command is input from a main CPU in step S58, the flow advances to step S61 (FIG. 14) to start pre-scan 1. During the pre-scan 1, the temperature of the thermal head 202 is detected to determine whether a difference between the detected temperature and the temperature value stored in step S52 exceeds an upper limit. If YES in step S63, the flow advances to step S64 to increase the pulse width of a strobed signal in the pre-scan 1, thereby increasing the energy applied to the thermal head 202. On the other hand, if the temperature difference is determined not to exceed the upper limit, i.e., if NO in step S63, the flow advances to step S65 to determine whether the temperature difference is equal to or less than a lower limit. If YES in step S65, the flow advances to step S66 to decrease the pulse width of this pre-scan or stop the pre-scan. The flow advances to step S67 to determine whether printing data of the next line is prepared. If the printing data of the next line is not prepared, the flow returns to step S61, and the above-mentioned process is repeatedly performed. A temperature detection timing ② in FIG. 12 is a timing at which temperature detection is repeatedly performed in this pre-scan 1.

When the printing data of the next line is prepared in step S67, the flow advances to step S68 to determine whether the data to be printed next is start data of one block. If NO in step S68, the flow advances to step S72 to immediately start printing of the next line. However, if YES in step S68, the flow advances to step S69 to start pre-scan 2. Therefore, the same process as in steps S44 to S47 in FIG. 11 is performed to repeatedly perform the pre-scan 2 until the temperature of the thermal head 202 falls within a predetermined temperature range.

As described above, according to the fifth embodiment, since the temperature of the thermal head 202 is detected even in the pre-scan 1 to set the temperature to fall within the predetermined range, accurate temperature control of the heating resistors can be performed. Unnecessary energy is not applied to the thermal head 202, formation of black stripes between the blocks can be reduced, and the time required for the pre-heat 2 for printing the start line of the next block can be shortened.

The present invention is not limited to a facsimile apparatus having an ECM receive function, but is also applicable to an image output apparatus having a buffer capable of storing image data to simultaneously print the image data stored in the buffer. In particular, the present invention is effective in such cases that image data of one page cannot be simultaneously stored in a buffer when heating resistors are energized to perform printing as in a thermal head or ink-jet head, or image data stored in a buffer is printed when the time interval between the printing cycles is increased. An effect derived from such control is most typical when image data to be printed is halftone image data.

The sixth embodiment of the present invention will be described with reference to FIGS. 15 and 16.

Figure 15:
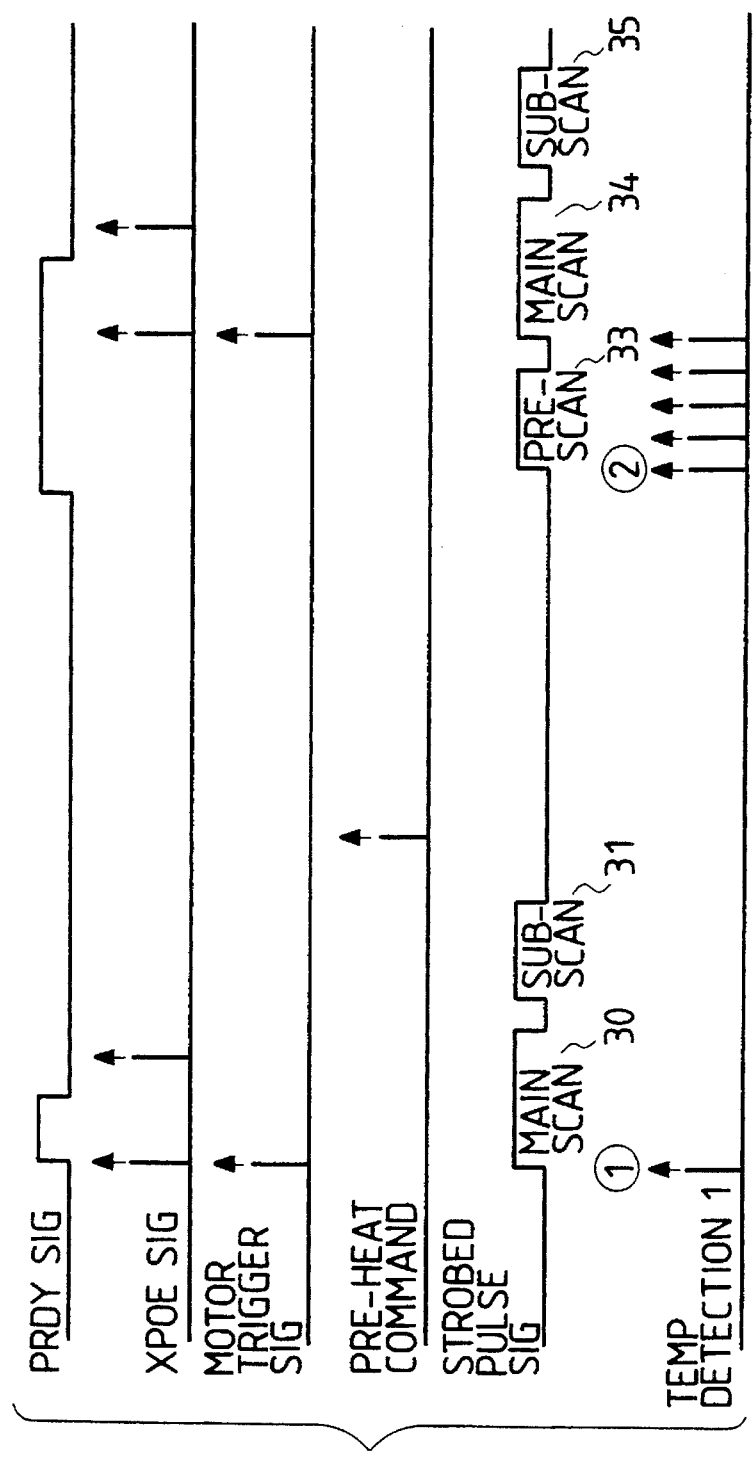
FIG. 15 is a timing chart showing output timings of various signals in a facsimile apparatus according to the sixth embodiment of the present invention.

FIG. 15 is a timing chart showing operation timings of the sixth embodiment of the present invention. As is apparent from FIG. 15 and FIG. 10 of the fourth embodiment, in the sixth embodiment, when the time interval between the image data transmission cycles is increased and thus the time interval between the image data recording cycles is increased accordingly, pre-scan (pre-heat 33) is performed to increase the temperature of heating resistors of a thermal head 202 to a predetermined temperature before main scan 33 for recording the start portion of image data of the next block is performed. That is, in the third embodiment, a strobed signal consisting of a plurality of small pulses is applied during this time interval (pre-scan 32 in FIG. 10). However, in the sixth embodiment, the pre-scan is performed before the start portion of the next block is recorded.

Figure 16:
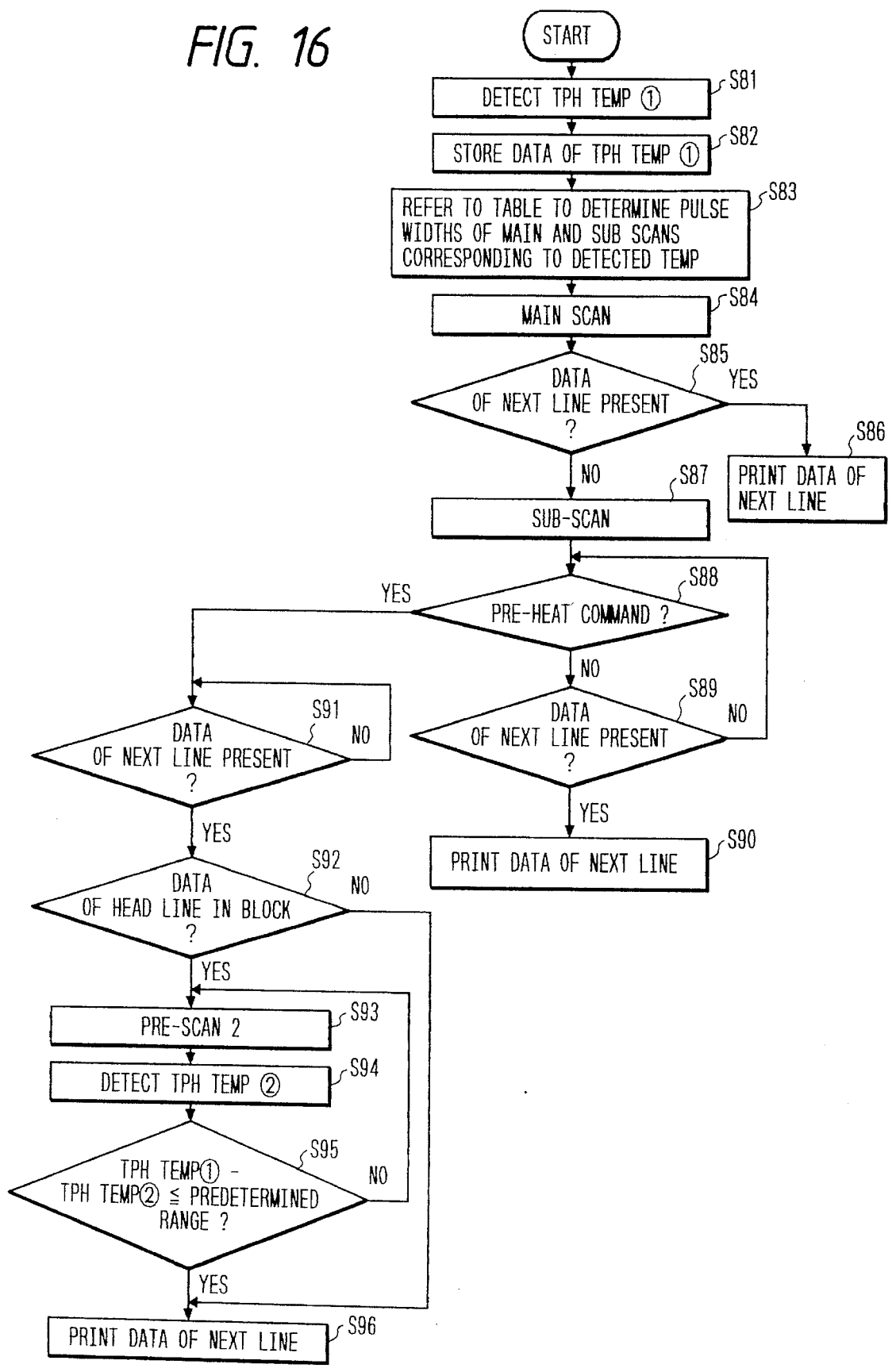
FIG. 16 is a flow chart showing an operation of a sub-CPU according to the sixth embodiment of the present invention.

The operation flow chart of this process is shown in FIG. 16. As is apparent from a comparison between the flow chart in FIG. 16 and the flow chart in FIG. 11, steps S41 and S42 in the flow chart of FIG. 11 are omitted from the flow chart of FIG. 16, and remaining steps in FIG. 16 are identical to those of FIG. 11. More specifically, when a pre-heat command is received in step S88, the flow advances to step S91 to wait for reception of printing data of the next line without performing the pre-scan 32 (FIG. 10). When the printing data of the next line is received, it is determined whether the received data is start data of the block (step S92). If NO in step S92, the next line is printed in step S95.

On the other hand, if YES in step S92, the pre-scan is performed in steps S93 to S95 until the temperature of the heating resistors of the thermal head 202 reaches a predetermined temperature. Thereafter, the printing data of the next line is printed. Note that the pulse width of the strobed signal in the pre-scan or main scan is determined in correspondence with the temperature of the thermal head 202 which is detected by a sensor 9 with reference to a table 211 of the ROM.

As described above, according to the sixth embodiment, since the number of pre-scan cycles for heating and driving the thermal head can be reduced, the energy consumption of the thermal head can be reduced, and the service life of the thermal head can be prolonged.

According to the third to sixth embodiments described above, the following effects are obtained.

(1) When the time interval between the image data recording cycles is increased, the number of strobed pulses applied to the heating resistors is increased to perform the sub-scan for maintaining the temperature of the heating resistors constant. In this case, various parameters such as the sub-scan count or the maximum value of the sub-scan count, or a value representing whether multi-scan is performed or not are changed in accordance with the size of the recording paper actually used in recording. Therefore, the parameters of the sub-scan can be optimized even if the recording paper size is changed. Therefore, optimal sub-scan can be performed in consideration of an influence of the recording paper size on vibrations of the recording paper.

(2) In the ECM mode or the like, recording quality influenced by the vibrations of the recording paper upon completion of recording of the last line of the block can be improved.

(3) Since the vibrations of the recording system including the recording paper may be increased upon decoding time variations caused by facsimile received signals, the above-described sub-scan is performed to prevent degradation of the recording quality.

(4) Even if the sub-scan count (or time) is increased to eliminate white stripes or the like caused by the influence of vibrations upon recording of the last line of the ECM received data, the recording density does not excessively increase.

The seventh embodiment of the present invention will be described below. The overall arrangement of a facsimile apparatus in the seventh embodiment is identical to that of FIGS. 1 and 2, and a detailed description thereof will be omitted.

Figure 17:
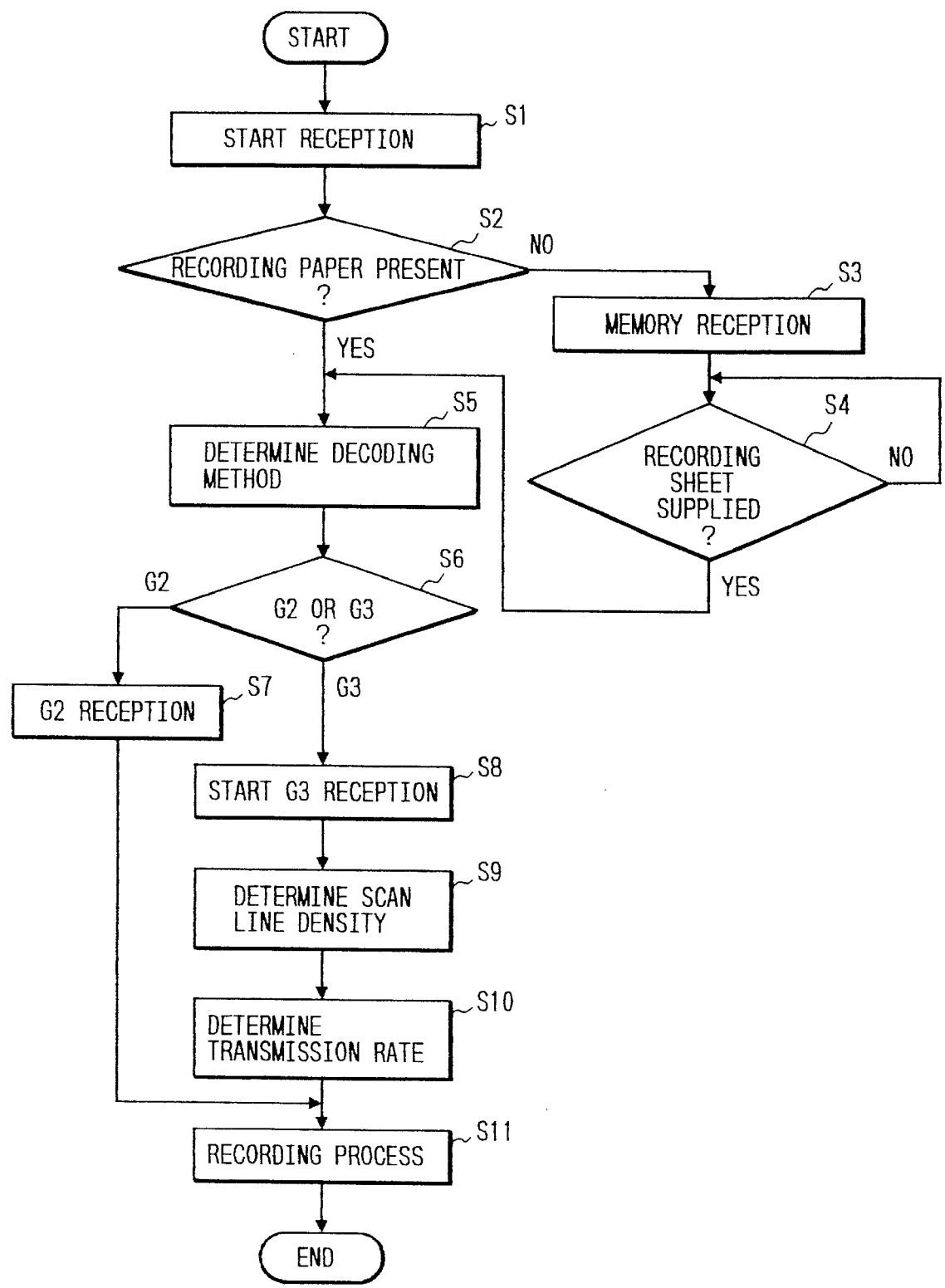
FIG. 17 is a flow chart showing an operation in a receive mode of a facsimile apparatus of the seventh embodiment.

FIG. 17 is an operation flow chart in a receive mode in the facsimile apparatus of the seventh embodiment. When reception is started in step S1, the flow advances to step S2 to determine whether the recording paper is present. If NO in step S2, the flow advances to step S3 to store received image data in an image memory 11 in FIG. 1. Thereafter, the stored image data is processed in steps from step S5 after the user inserts recording paper into the facsimile apparatus in step S4.

On the other hand, when the recording paper is present in step S2, the flow advances to step S5. In step S5, to record data on recording paper in this apparatus, the decoding method of a codec 204 is determined in accordance with a coding method (e.g., MR or MH) of the source transmission image data.

It is determined in step S6 whether the source apparatus is a G2 or G3 apparatus. If the source apparatus is determined to be a G2 apparatus, the flow advances to step S7 to perform G2 reception, and at the same time, the recording process is performed in step S11.

However, if the source apparatus is determined to be a G3 apparatus in step S6, the flow advances to step S8 to start G3 reception. In step S9, a scan line density is determined to change control of a write motor (paper feed motor) 21 in accordance with the scan line density of the image data from the source apparatus, thereby changing the image recording density. The flow advances to step S10 to determine a transmission rate. The transmission rate is determined in accordance with a line noise condition and the transmission capacity of the source apparatus. The recording process is performed in step S11. In the recording process in step S11, the maximum multi-scan count and whether multi-scan is performed or not are determined on the basis of the decoding method and the scan line density information which are determined in the above steps. Recording on the recording paper is performed while decoding is being performed by the codec 204.

Figure 18:
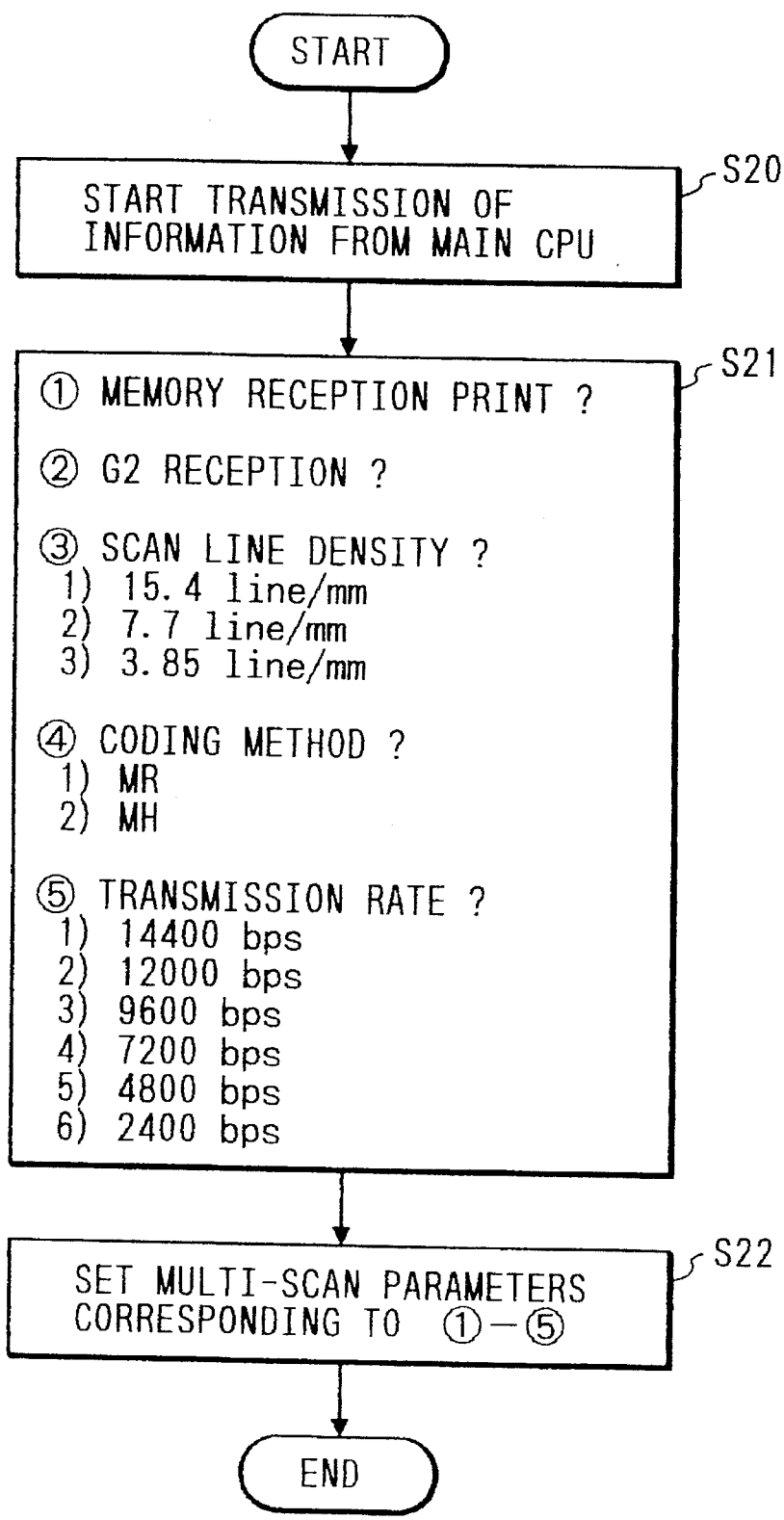
FIG. 18 is a flow chart showing an operation in a received image recording mode of the facsimile apparatus of the seventh embodiment.

FIG. 18 is an operation flow chart of a sub-CPU 201 in a received image recording mode of the facsimile apparatus of the seventh embodiment. In steps S20 and S21, information for determining sub-scan parameters is transmitted from the main CPU to the sub-CPU 201. This is performed prior to the recording process in step S11. The contents of the transmitted information represent ① whether data to be recorded is memory received data, ② whether data to be recorded is G2 or G3 reception data, ③ a scan line density, ④ a coding method (e.g., MR or MH), and ⑤ a transmission rate.

In step S22, the sub-CPU 201 optimally sets the maximum value of the sub-scan count (or the maximum value of sub-scan time) on the basis of the information input in step S20. In addition, a setup representing whether the sub-scan is performed or not is also changed. The optimizing method is performed such that an average value of the recording time interval in each of items ② to ⑤ of the above information is calculated. As the calculated recording time interval is longer, the maximum value of the sub-scan count is set to be larger. When memory received data is to be recorded, the transmission rate in memory reception in the sub-scan parameter setup will not be taken into consideration because the line transmission rate does not adversely affect the data transmission since the data is transmitted from the image memory 11.

Figure 19:
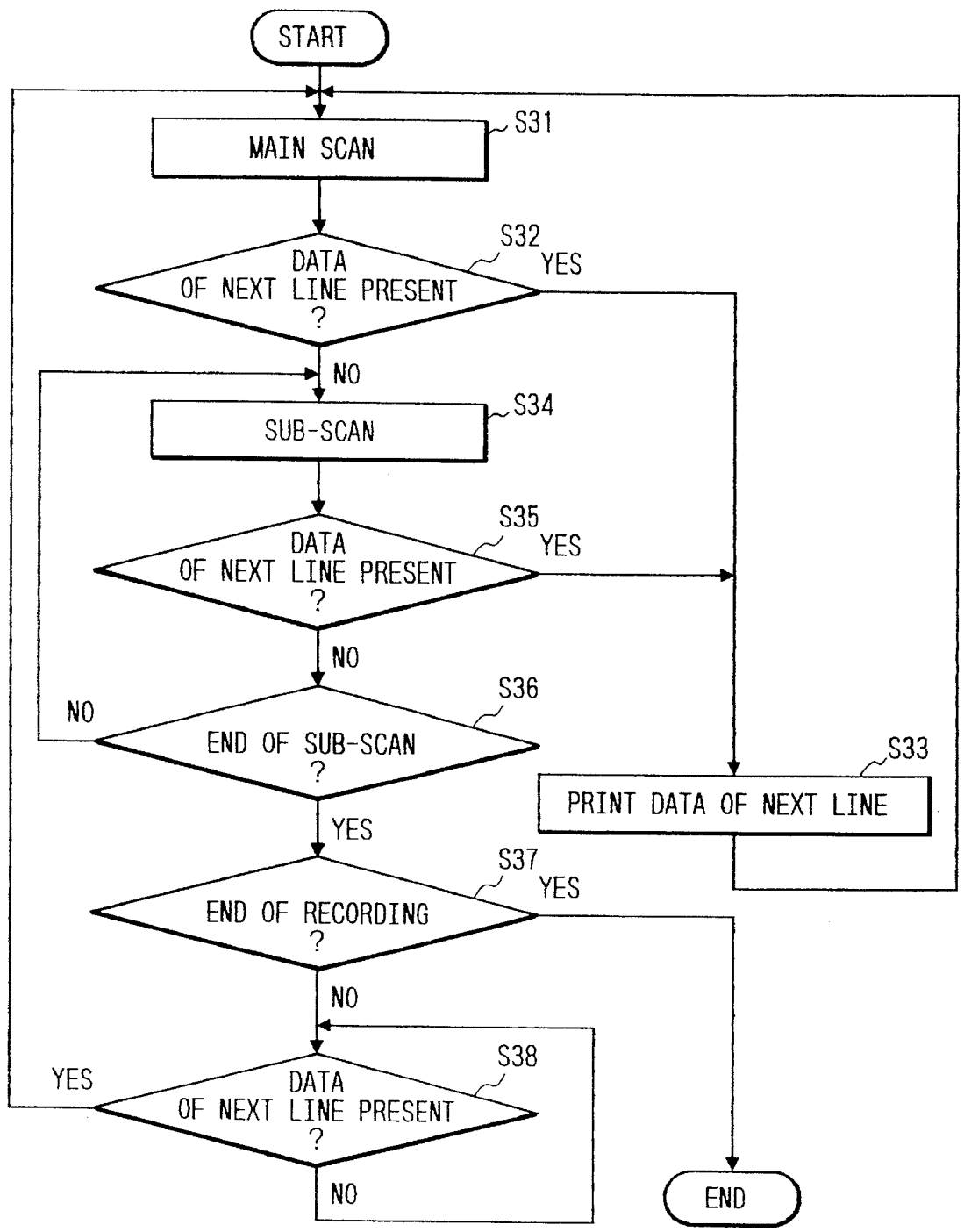
FIG. 19 is a flow chart showing the sequence of a recording process in the facsimile apparatus of the seventh embodiment.
Figure 20:
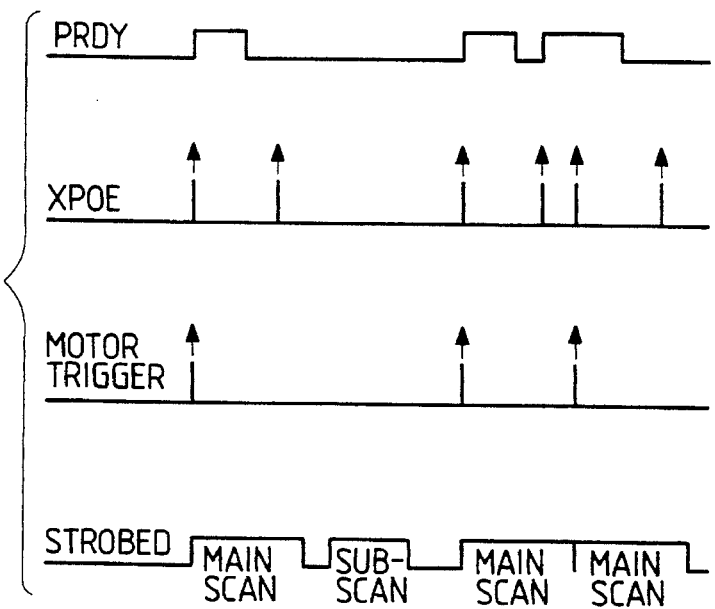
FIG. 20 is a timing chart for explaining a sub-scan function of the facsimile apparatus of the seventh embodiment.

FIG. 19 is a flow chart representing the sequence of the recording process performed by the sub-CPU 201 in the facsimile apparatus of the seventh embodiment. FIG. 20 is a timing chart for explaining a sub-scan function of the facsimile apparatus of the seventh embodiment. A PRDY signal is transmitted from the codec 204 in FIG. 1 to the sub-CPU 201. The PRDY represents that the decoded data to be recorded is present in the codec 204.

An XPOE signal is a response signal generated in response to the PRDY signal to cause the codec 204 to transmit the recording data to a smoothing IC 203. When the codec 204 completely transmits the recording data to the smoothing IC 203, the PRDY signal is disabled. The XPOE signal also has a function of informing the codec 204 of the end of transmission. A motor trigger signal is included in a control signal output from the sub-CPU 201 to a current driver 22. The excitation state of the write motor 21 is changed by this motor trigger signal. As a result, the motor 21 performs a stepping operation.

In addition, a strobed signal is a pulse signal supplied from the sub-CPU 201 to the thermal print head of a TPH 202. The TPH 202 is heated by this strobed signal, so that an image can be recorded on recording paper such as heat-sensitive paper brought into contact with the TPH 202. The temperature of the thermal print head can also be kept constant. The strobed signals are classified into a main-scan strobed signal and a sub-scan strobed signal. The main-scan strobed signal is the strobed signal for recording image data sent to the TPH 202. The sub-scan (or called multi-scan) strobed signal is continuously supplied to record the image data for a predetermined period of time (or sub-scan count) as an extra time when image data is not continuously supplied to the TPH 202, i.e., when the time interval between the image data transmission cycles is increased. Therefore, the image recording density can be increased.

The smoothing IC 203 generates interpolated data between image data sent from the codec 204 and transmits the interpolated data to the TPH 202. The TPH 202 records the interpolated data, thus providing an interpolation function. However, for the sake of descriptive simplicity, timings obtained when the interpolation function is not provided are illustrated in the timing chart of this embodiment.

A flow chart in FIG. 19 will be described below. Data of one line is set in step S31, and recording of one line is performed by outputting the main-scan strobed signal. It is determined in step S32 whether recording data of the next line is present. This can be determined by checking the PRDY signal from the codec 204. If the recording data of the next line is present, the flow advances to step S33 to perform the main scan for recording the data of the next line.

If NO in step S32, the flow advances to step S34 to start the sub-scan. At this time, it is determined in step S35 whether recording data of the next line is present. If YES in step S35 (i.e., if the PRDY signal is enabled), the flow advances to step S33 to record the data of the next line. On the other hand, if NO in step S35, the flow advances to step S36 to determine whether the sub-scan is ended. This is performed by checking whether the sub-scan count exceeds the maximum value set in the flow chart of FIG. 18. If NO in step S36, the flow returns to step S34, and the above process is repeated.

When the end of sub-scan is determined in step S36, the flow advances to step S37 to determine whether recording of all the image data is ended. If YES in step S37, this process is ended. However, if NO in step S37, the flow advances to step S38 to wait until recording data of the next line is decoded.

As described above, in the facsimile apparatus of the seventh embodiment, as shown in the flow chart of FIG. 19 and the timing chart of FIG. 20, when the time interval between the image data transmission cycles, i.e., the time interval between the main scan cycles is increased, the sub-scan (or multi-scan) is performed to prevent an excessive decrease in temperature of the thermal print head. The maximum value of the sub-scan count is appropriately set in accordance with the recording time interval to prevent the excessive scan and maintain high recording quality. The effects of the facsimile apparatus of the seventh embodiment will be described below.

1) In the facsimile apparatus capable of performing a multi-scan (or sub-scan) operation for increasing the number of image recording strobed pulses applied to the heating resistors to maintain the temperature of the heating resistors constant when the time interval between the image data recording cycles is increased, a multi-scan count or the maximum value of the multi-scan count, or setup representing whether multi-scan is performed or not can be changed depending on the transmission rate. For this reason, when the transmission rate is low, the maximum value of the multi-scan count is increased to prevent a decrease in recording density, and a clear received image free from blurring can be obtained. When the transmission rate is high, the multi-scan count or the maximum value of the multi-scan count is decreased to prevent an excessive increase in recording density and to obtain a clear image having no connections in a character or between characters.

2) The maximum value of the multi-scan count or setup representing whether multi-scan is performed or not can be changed depending on the coding method such as MH (Modified Huffman) or MR (Modified READ) of image data to be transmitted. The recording image density can be optimized as in 1).

3) In the facsimile apparatus capable of performing analog facsimile transmission (to be referred to as G2 hereinafter) or digital facsimile transmission (to be referred to as G3 hereinafter), the maximum value of the multi-scan count or setup representing whether multi-scan is performed or not can be changed depending on the transmission modes. The recording image density can be optimized regardless of a change in transmission mode, i.e., G2 or G3.

4) In the facsimile apparatus having an image memory capable of storing image data, the maximum value of the multi-scan count or setup representing whether multi-scan is performed or not can be changed depending on the modes, i.e., printing of image data stored in the memory and printing of image data not stored in the memory. The recording image density can be optimized even in printing the image data stored in the memory as in 1) to 3).

5) The maximum value of the multi-scan count or setup representing whether multi-scan is performed or not are not changed depending on the transmission rate in the mode for recording received image data stored in the memory. The recording image density can be optimized even in the mode for recording image data stored in the memory at a predetermined recording rate normally free from an influence of the transmission rate as in 1) to 4).

6) The maximum value of the multi-scan count or setup representing whether multi-scan is performed or not can be changed depending on the scan line densities such as standard and fine scan line densities. The recording image density can be optimized as in 1) to 5).

The seventh embodiment exemplifies a facsimile apparatus, but may be applied to any other similar data communication apparatus.

The eighth embodiment of the present invention will be described below.

A thermal print head (TPH) for recording an image is used in the recording system of the facsimile apparatus. Data transmission to the TPH is performed by serially transmitting data of one line bit by bit. When the data of one line is transmitted and stored in the TPH, this data is latched. The strobed signal is enabled to record data of one line based on the latched data. To record data of the next line, the recording paper is moved with respect to the TPH to repeat recording of data of one line. The moving direction of the recording paper with respect to the TPH is fixed.

However, the moving direction of the recording paper with respect to the TPH may be reversed to arrange a mechanism system of a facsimile apparatus when downsizing (compactness) of a facsimile apparatus is to be achieved or when the positional relationships between the TPH and the recording paper and between the TPH and an ink sheet and states of the recording paper and the ink sheet moved with respect to the TPH greatly influence image quality in a facsimile apparatus of a thermal transfer scheme.

In order to effectively realize this, a serial-input, serial-output last-in first-out (LIFO) memory is arranged to reverse the direction of the recording data of one line, and the data is transmitted to the TPH.

A method of manufacturing a TPH having this function in place of the conventional TPH may be employed. In this case, the TPH having the function of reversing the direction of the recording data cannot be commonly used with the conventional TPH to adversely affect the control. In addition, the development of this special TPH is time-consuming and cumbersome, and the development cost hinders development of a facsimile apparatus. As a result, efficient product developments cannot be performed.

In the facsimile apparatus, therefore, a serial-in, serial-out last-in first-out line memory must be arranged to reverse the direction of recording data of one line, and this data must be transmitted to the TPH.

A conventional LIFO memory is constituted by two line memories. When a serial input signal of one line is completely stored in one line memory, this signal is transmitted to the other line memory. At this time, the line memory which has stored the input signal of one line outputs it from the last serial input signal component. These operations are alternately repeated in the conventional LIFO memory.

However, each line memory requires a capacity of 2,048 bits per line when the paper size is, for example, the B4 size. When this line memory is arranged by a custom IC such as a gate array, the gate size becomes very large to increase the hardware cost. This hardware cost adversely affects the product cost. As a result, an inexpensive apparatus cannot be offered to users.

In the facsimile apparatus of this embodiment, the LIFO memory is constituted by one line memory to reduce the memory cost into ½ the conventional memory cost, thereby offering an inexpensive facsimile apparatus to users.

Figure 21:
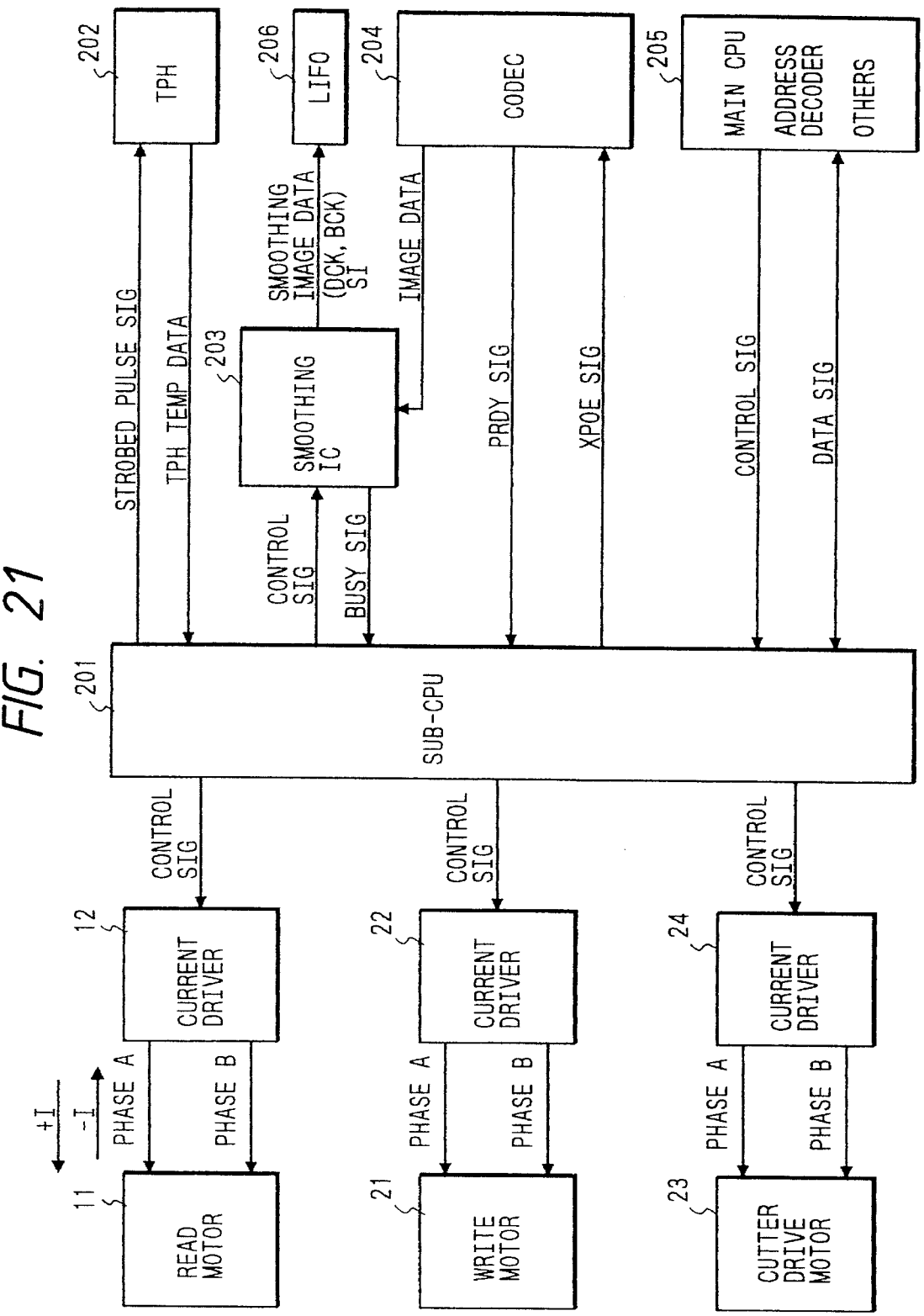
FIG. 21 is a block diagram showing an arrangement of sub-CPU peripheral circuits for controlling a recording system and other units in a facsimile apparatus of the eighth embodiment.

The schematic arrangement of the facsimile apparatus of this embodiment is the same as that of the first embodiment (FIG. 1), and a detailed description thereof will be omitted. FIG. 21 is a block diagram showing an arrangement of a peripheral portion of a sub-CPU for controlling a recording system and other units in the facsimile apparatus of this embodiment. The same reference numerals as in the first embodiment of FIG. 2 denote the same parts in FIG. 21, and a detailed description thereof will be omitted. A LIFO memory 206 transmits image data from a smoothing IC 203 to a TPH 202 line by line. The LIFO memory 206 will be described in detail below.

Figure 22:
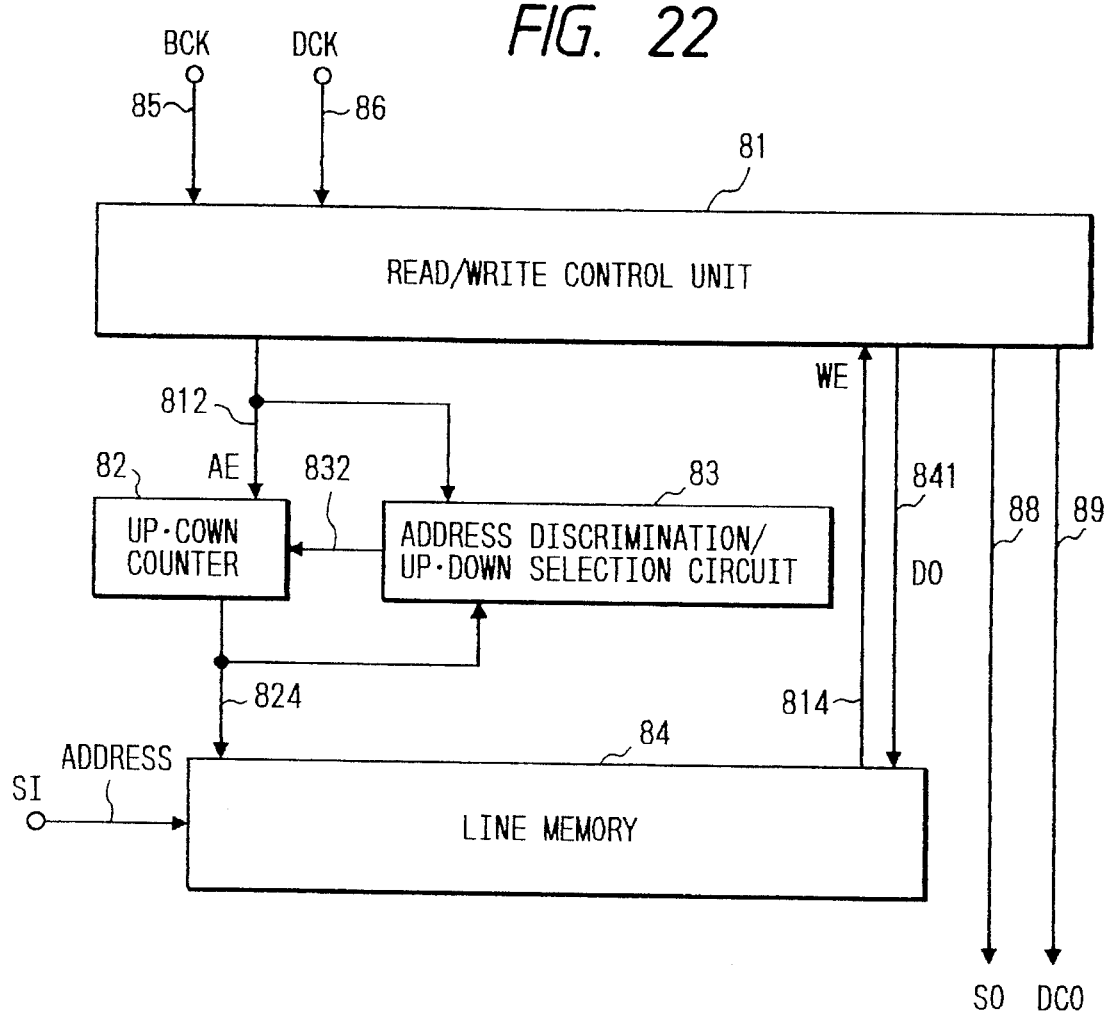
FIG. 22 is a block diagram showing an arrangement of a LIFO memory 206 of the eighth embodiment.

FIG. 22 is a block diagram showing an arrangement of the LIFO memory 206 of the eighth embodiment. Referring to FIG. 22, a read/write control unit 81 generates a timing signal for a read or write signal for reading or writing the line memory. An up.down counter 82 determines an access address of the line memory. An address discrimination/up.down selection circuit 83 controls to set the up.down counter 82 as an up or down counter so that the access address of the line memory which is determined by the up.down counter 82 is detected and the address returns to the start address at 1728 if the paper size is, e.g., the A4 size. A one-bit line memory 84 can store data of 1728 or more if the paper size is, e.g., the A4 size.

A reference clock (BCK clock) 85 is required to operate the LIFO memory including the read,write control unit 81. A write clock (DCK clock) 86 is used to write data in the LIFO memory. An image data input (SI data) 87 is supplied from the smoothing IC 203. Output data (SO data) 88 is output to the TPH 202. A write clock (DCO clock) 89 determines a timing for writing the SO data 88 in the TPH 202.

A counter clock (AE clock) 812 is output from the read/write control unit 81 to the up.down counter 82. The AE clock 812 is also used as a trigger signal for up.down selection in the address discrimination/up.down selection circuit 83. An access address 824 is output from the up.down counter 82 to the line memory 84 to determine the address for accessing the line memory 84. The access address 824 is also input to the address discrimination/up-down selection circuit 83. A selection instruction signal 832 is output from the address discrimination/up.down selection circuit 83 to the up.down counter 82 to set the up.down counter 82 as an up or down counter. A data write signal (WE clock) 814 is used to write data in the line memory. When the WE clock 814 goes from low level to high level, the SI data 87 is written in the line memory 84. If the WE clock 814 is set at high level, the line memory 84 is set in a read mode. Output data (DO data) 841 is output from the line memory 84 to the read/write control unit 81.

Figure 23:
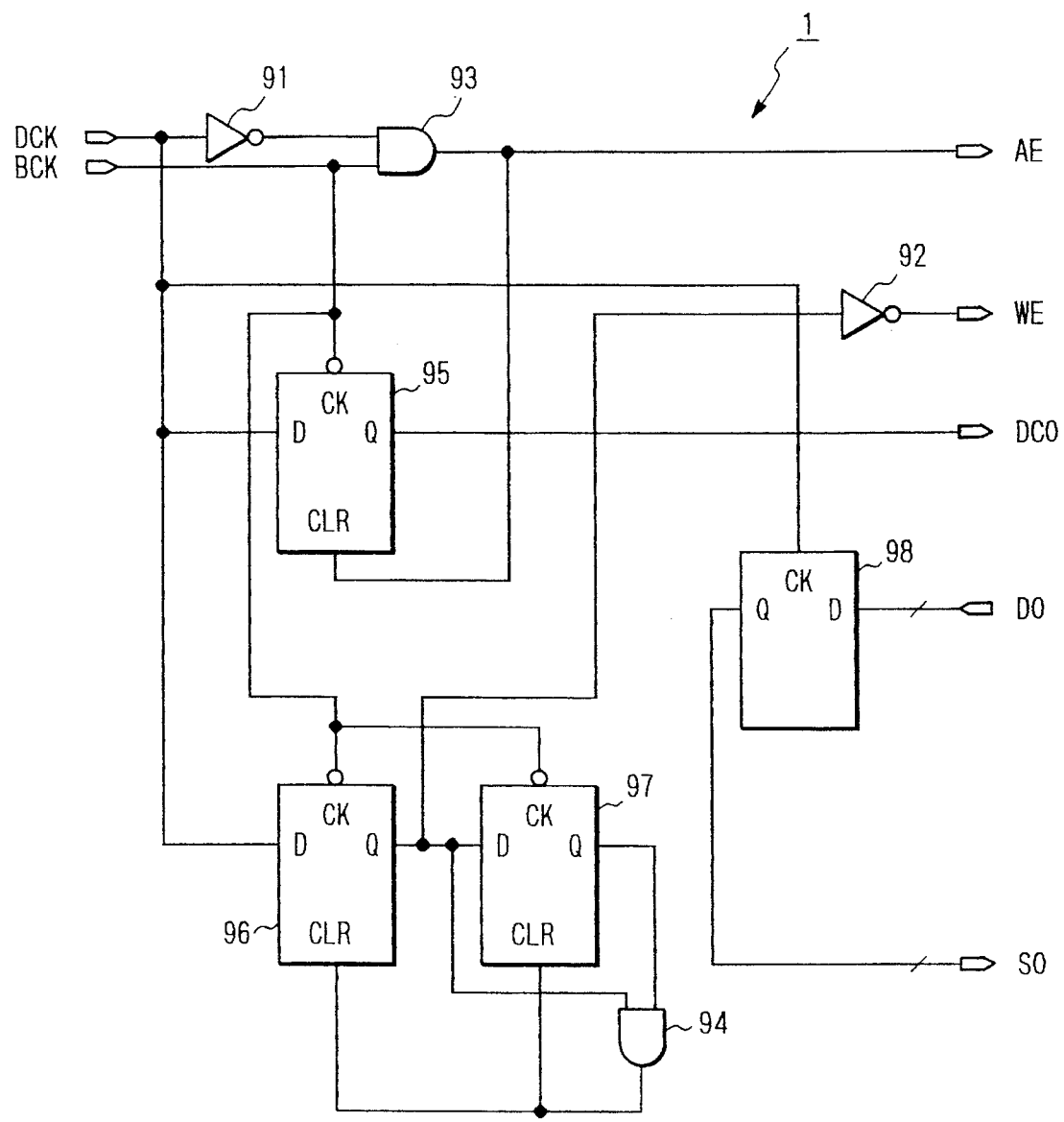
FIG. 23 is a circuit diagram of a read/write control unit.

FIG. 23 is a diagram showing the circuit arrangement of the read/write control unit 81. The read/write control circuit 81 includes inverters 91 and 92, AND gates 93 and 94, and data latch ICs 95 to 98. An operation of this unit will be apparent from a description with reference to a timing chart (FIG. 24).

Figure 24:
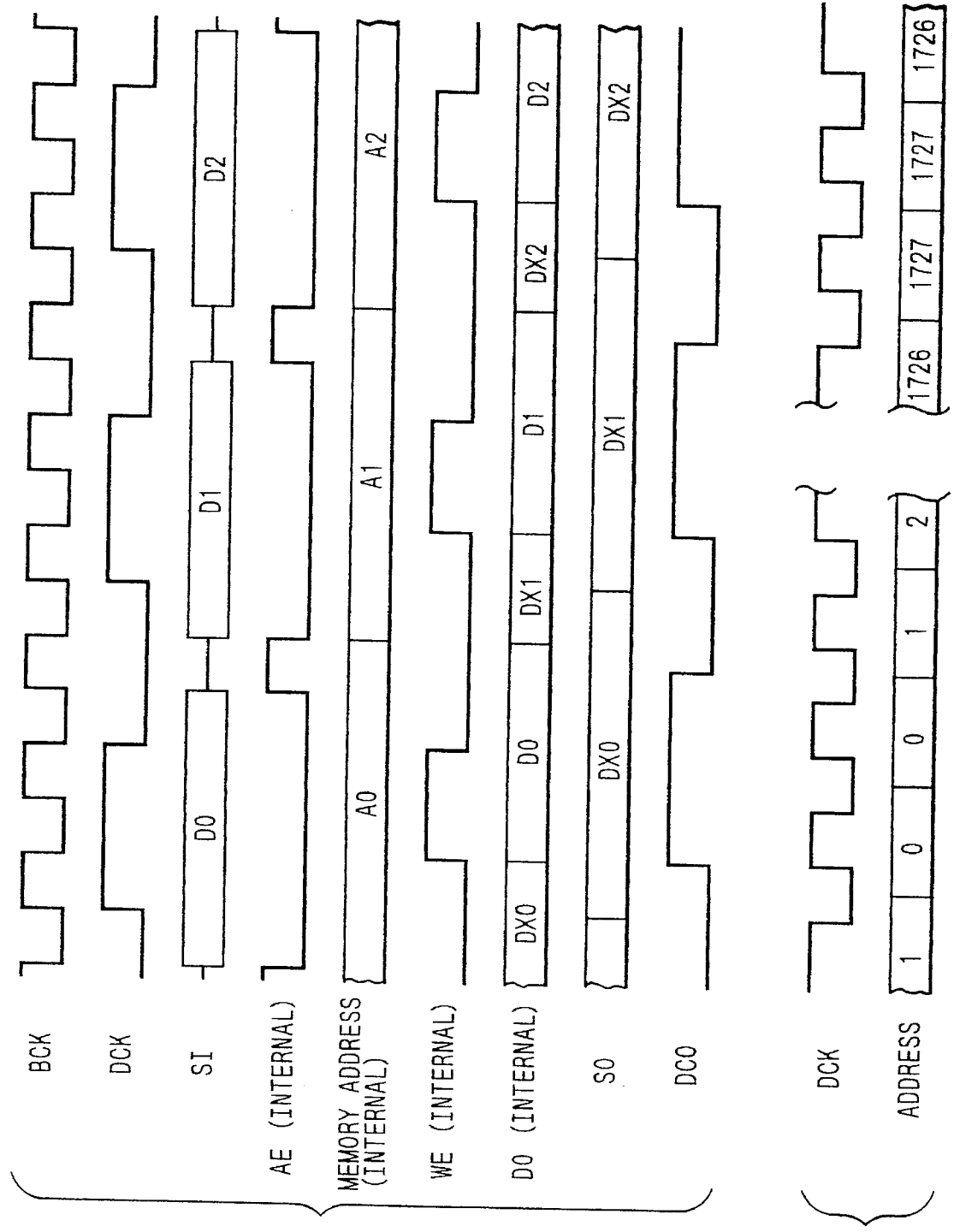
FIG. 24 is a timing chart showing input/output signals and main internal signals in the LIFO memory and FIG. 25 is a view showing a state wherein an access address of a line memory is folded in units of data bit lengths.

FIG. 24 is a timing chart showing timings of input/output signals and main internal signals in the LIFO memory.

The smoothing IC 203 outputs input data D0 to D2 (SI data 87). The access address 824 corresponds to access addresses A0 to A2. The addresses A0 to A2 serve as address data for reading out data (DO data 841) from the line memory 84 to the TPH 202 and also serve as addresses for writing the SI data 87 in the line memory 84. Output data DX0 to DX2 (SO data 88) are output to the TPH 202.

The DCK clock 86 from the smoothing IC 203 is used as a trigger signal to generate the WE clock 814 for writing the SI data 87 in the line memory 84. The DO data 841 from the line memory 84 is data accessed by the access address 824. The DO data 841 is latched by the data latch IC 98 before the DO data 841 is written in the line memory 84 in response to the WE clock 814 and is output as the SO data 88 to the TPH 202. A write clock DCO is generated to write the SO data 88 in the TPH 202.

The access address 824 changes at the trailing edge of the AE clock 812. The BCK clock 85 from the smoothing IC 203 is used to generate timing pulses for these internal and output signals. Note that the DCK clock 86 is generated by the smoothing IC or the like by frequency-dividing the BCK clock 85 into ⅓.

Figure 25:
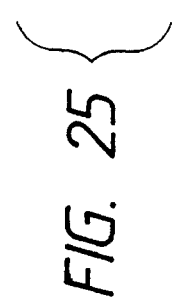

FIG. 25 shows a state of the access address 824 obtained by counting the AE clocks 812. The access address 824 is folded every one-line data bit length. The access address 824 is folded so that the up/down operation of the counter is switched every time the addresses of 1,728 bits are counted when the data length is, e.g., the A4 data length. By this address setup, for example, data written in the line memory 84 by the up counter can be read out by the down counter, thereby performing the LIFO operation. In addition, since the write operation is performed by the address used for executing data read access, only one line memory is required.

By mounting the above-described LIFO memory in the facsimile apparatus, the mounting direction can be reversed even in use of the conventional TPH, thereby enhancing flexibility in mechanism construction.

As described above, according to the LIFO memory of the eighth embodiment, the last-in first-out circuit conventionally constituted by two line memories can be constituted by one line memory with a simple arrangement. For this reason, the cost of LIFO-mounted electronic device such as a facsimile apparatus can be reduced, so that an inexpensive apparatus can be offered to users.

The first to eighth embodiments exemplify facsimile apparatuses. The present invention is not limited to these apparatuses. The present invention is also applicable to recorders (e.g., printers) connected to document processing apparatuses and various image processing apparatuses, or recorders of various data communication apparatuses.

A recording head of the facsimile apparatus of each embodiment described above is a thermal head. However, the present invention is not limited to this. For example, the present invention is also applicable to a recorder having an ink-jet recording head for converting electric energy to heat energy and ejecting ink utilizing this heat energy.

The present invention may be applied to a system constituted by a plurality of devices or an apparatus constituted by one device. In addition, the present invention can also be applied when the present invention is achieved by supplying a program for practicing the present invention, as a matter of course.

What is claimed is:

1. An image recording apparatus for recording an image on a recording medium, in a predetermined unit amount, using a recording head driven in accordance with image data, said apparatus comprising:

storage means for storing input image data;

instructing means for instructing recording of image data of a predetermined amount stored in said storage means when the image data of the predetermined amount is stored in said storage means, said recording head recording the image data of the predetermined amount by repeating recording predetermined unit amounts of the image data;

moving means for relatively moving said recording head and the recording medium in accordance with an instruction by said instruction means; and recording control means for driving said recording head a predetermined delay time from issuance of the instruction by said instructing means when next recording in the predetermined unit amount cannot be performed immediately after the recording in the predetermined unit amount, wherein said recording control means drives said recording head before a lapse of the predetermined delay time from the issuance of the instruction by said instructing means when a first part of the image data of the predetermined amount is to be recorded.

2. An apparatus according to claim 1, wherein said recording control means drives said recording head immediately after the start of the relative movement.

3. An apparatus according to claim 1, wherein said recording control means drives said recording head for a predetermined period of time before the recording in the predetermined unit amount when the next recording in the predetermined unit amount cannot be performed immediately after the recording in the predetermined unit amount.

4. An apparatus according to claim 1, wherein said recording control means drives said recording head at an energy lower than that in actual recording before the recording of the image data of the predetermined amount.

5. An apparatus according to claim 1, wherein the predetermined unit amount is one line.

6. An apparatus according to claim 1, further comprising:

receiving means for receiving coded transmission data; and decoding means for decoding the coded data received by said receiving means.

7. An apparatus according to any one of claims 1 to 6, wherein said recording head comprises a plurality of heating resistors heated upon energization, said heating resistors being heated to record an image on the recording medium.

8. An apparatus according to claim 7, wherein said plurality of heating resistors correspond to a maximum recording width.

9. An image recording apparatus for recording an image on a recording medium, in a predetermined unit amount, using a recording head driven in accordance with image data, comprising:

driving means for driving said recording head before a start of next recording in a predetermined unit amount when the next recording in the predetermined unit amount cannot be performed immediately after recording in the predetermined unit amount; and setting means for setting a drive condition of said recording head by said driving means in accordance with a size of the recording medium.

10. An apparatus according to claim 9, further comprising detecting means for detecting a temperature of said recording head, and wherein said setting means sets the drive condition in accordance with the size of the recording medium and a temperature detected by said detecting means.

11. An apparatus according to claim 10, wherein said setting means comprises storage means for storing tables representing relationships between the temperatures of said recording head and the drive conditions in units of sizes of the recording media, a predetermined table is selected in accordance with a size of a recording medium, and the drive condition is set in accordance with the selected table and the temperature detected by said detecting means.

12. An apparatus according to claim 11, wherein said storage means further stores a table representing a relationship between the temperature of said recording head and a drive condition of said recording head in an image recording mode, thereby setting a drive condition in the recording mode on the basis of said table.

13. An apparatus according to any one of claims 10 to 12, wherein the drive condition is a pulse width of a drive voltage applied to said recording head.

14. An apparatus according to claim 13, wherein said recording head comprises a plurality of heating resistors heated upon energization, said heating resistors being heated to record an image on the recording medium.

15. An apparatus according to claim 14, wherein said plurality of heating resistors correspond to a maximum recording width.

16. An apparatus according to claim 9, wherein the predetermined unit amount is one line.

17. An apparatus according to claim 9, further comprising:

receiving means for receiving coded transmission data; and decoding means for decoding the coded data received by said receiving means.

18. An apparatus according to any one of claims 9 to 12, 16 and 17, wherein said recording head comprises a plurality of heating resistors heated upon energization, said heating resistors being heated to record an image on the recording medium.

19. An apparatus according to claim 18, wherein said plurality of heating resistors correspond to a maximum recording width.

20. An image recording apparatus for recording an image on a recording medium, in a predetermined unit amount, using a recording head driven in accordance with image data, comprising:

storage means for storing input image data;

instructing means for instructing recording of image data of a predetermined amount stored in said storage means when the image data of the predetermined amount is stored in said storage means;

detecting means for detecting a temperature of said recording head;

driving means for preliminarily driving said recording head before the recording of the image data of the predetermined amount; and control means for controlling a drive condition of said driving means so as to set the temperature of said recording head to fall within a predetermined range before the start of the recording of the image data of the predetermined amount, whereby initial data of the image data of the predetermined amount is recorded in a state that the temperature of said recording head falls within the predetermined range.

21. An apparatus according to claim 20, wherein said control means comprises memory means for storing a table representing a relationship between the temperature of said recording head and the drive condition, so that data associated with the drive condition is read out from said memory means in accordance with the temperature detected by said detecting means, and the drive condition in the preliminary driving is set on the basis of the read out data.

22. An apparatus according to claim 20 or 21, wherein the drive condition is a pulse width of a drive voltage applied to said recording head.

23. An apparatus according to claim 22, wherein said recording head comprises a plurality of heating resistors heated upon energization, said heating resistors being heated to record an image on the recording medium.

24. An apparatus according to claim 23, wherein said recording head comprises a full-line head and said plurality of heating resistors correspond to a maximum recording width.

25. An apparatus according to claim 20, further comprising:

receiving means for receiving coded transmission data; and decoding means for decoding the coded data received by said receiving means.

26. An apparatus according to any one of claims 20, 21 and 25, wherein said recording head comprises a plurality of heating resistors heated upon energization, said heating resistors being heated to record an image on the recording medium.

27. An apparatus according to claim 26, wherein said recording head comprises a full-line head and said plurality of heating resistors correspond to a maximum recording width.

28. An apparatus according to claim 20, wherein the predetermined unit amount is one line.

29. An image recording apparatus for recording an image on a recording medium, in a predetermined unit amount, using a recording head driven in accordance with image data, comprising:

storage means for storing input image data in units of lines;

address generating means for sequentially generating address values for accessing said storage means in a predetermined rule and generating address values in an order opposite to that of a previous line upon completion of generation of the address values of one line;

reading means for reading out image data from said storage means using address values generated by said address generating means;

writing means for writing new image data at addresses used for read access by said reading means; and driving means for driving said recording head on the basis of the image data read out by said reading means.

30. An apparatus according to claim 29, further comprising:

receiving means for receiving coded transmission data; and decoding means for decoding the coded data received by said receiving means, wherein said storage means stores image data after decoding by said decoding means.

31. An apparatus according to claim 29, wherein said recording head comprises a plurality of heating resistors heated upon energization, said heating resistors being heated to record an image on the recording medium.

32. An apparatus according to claim 29, wherein said recording head comprises a full-line head having a plurality of heating resistors corresponding to a maximum recording width.

33. An apparatus according to claim 29, wherein the predetermined unit amount is one line.

* * * * *

UNITED STATES PATENT AND TRADEMARK OFFICE
CERTIFICATE OF CORRECTION

PATENT NO. : 5,533,171
DATED : July 2, 1996
INVENTOR(S) : Shigeo MIURA

It is certified that error appears in the above-indentified patent and that said Letters Patent is hereby corrected as shown below:

COLUMN 3:

Line 53, "preset" should read --present--;
Line 60, "preset" should read --present--.

COLUMN 4:

Line 21, "memory" should read --memory;--.

COLUMN 20:

Line 15, "read, write" should read --read/write--.

COLUMN 21:

Line 22, "of" should read --of a--.

Signed and Sealed this

Twenty-ninth Day of October 1996

Attest:

BRUCE LEHMAN

Attesting Officer    *Commissioner of Patents and Trademarks*